(12) United States Patent
Koehn et al.

(10) Patent No.: US 7,399,153 B2
(45) Date of Patent: Jul. 15, 2008

(54) BIG BALE LOADER, RETRIEVER, AND TRANSPORTER

(76) Inventors: Christopher R. Koehn, 3401 NW. 2ND Ave., New Plymouth, ID (US) 83655; Donavon G. Koehn, 5785 Akron Rd., New Plymouth, ID (US) 83655

( * ) Notice: Subject to any disclaimer, the term of this patent is extended or adjusted under 35 U.S.C. 154(b) by 274 days.

(21) Appl. No.: 11/125,717

(22) Filed: May 9, 2005

(65) Prior Publication Data
US 2006/0251501 A1 Nov. 9, 2006

(51) Int. Cl.
*A01D 85/00* (2006.01)
(52) U.S. Cl. .................................... 414/24.5
(58) Field of Classification Search ............. 414/24.5, 414/111
See application file for complete search history.

(56) References Cited

U.S. PATENT DOCUMENTS

| | | | |
|---|---|---|---|
| 4,032,184 A * | 6/1977 | Blair | ............................ 294/88 |
| 4,498,829 A | 2/1985 | Spikes | |
| 5,758,481 A | 6/1998 | Fry | |
| 6,048,160 A * | 4/2000 | Reist et al. | .................... 414/555 |
| 6,220,811 B1 * | 4/2001 | Bernecker | .................... 414/555 |
| 6,312,205 B1 * | 11/2001 | Vandenberg | ................ 414/24.5 |
| 6,514,029 B2 * | 2/2003 | Millsap | ...................... 414/24.5 |

* cited by examiner

*Primary Examiner*—Saul J. Rodriguez
*Assistant Examiner*—Joshua I Rudawitz
(74) *Attorney, Agent, or Firm*—Charles R. Clark

(57) ABSTRACT

A simple agricultural big bale loader, retriever, and transporter provides an efficient tool that should save time and labor costs over other existing loaders. The invention permits a novel lifting, rotating, and depositing of a big bale from the ground in the field onto and across an elevating and flipping receiving table, consolidating of a plurality of the lifted bales into two-high or three-high layers of bales on a stack carriage bed, transporting of the bales to a storage location, tilting of the carriage bed downward at the rear and upward at the front approximately 90 degrees, and depositing of the stack at the storage location.

2 Claims, 15 Drawing Sheets

BIG BALE LOADER, RETRIEVER, AND TRANSPORTER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates to bale loading of a transport vehicle in an agricultural setting. The invention enables the lifting, rotating, and depositing of a big bale from the ground in the field onto a modified truck or vehicle for consolidation into a load with other bales for transport from the field over highways at highway speeds. The invention in the preferred embodiment serves as a useful modification of a ten wheel truck having a longitudinal two channel main frame into an autonomous big bale loader, retriever, and transporter for picking up serially individual big bales in a field and assembling the resulting group of big bales into a double or triple layer stack of bales on a stack carriage bed mounted to the main frame in place of a conventional truck bed for transport to a consolidated bale storage location and autonomous depositing of the stack at that location. The stack carriage bed is pivotally mounted on the main frame to allow tilting up of the front end of the carriage bed and tilting down of the back end of the carriage bed to the ground and return. The transporter can also be used to retrieve a stack of bales and move them to another location.

A bale pickup assembly and a swing gate assembly of the invention have a field deployment position for picking up individual bales in the field and a stowed over-the-road transport position for when the transporter is coming or going from the field.

The invention in its preferred embodiment allows for improved handling of individual big bales in the field and for improved handling of consolidated stacks of bales both in the field and at storage locations.

2. Description of Related Art

A number of big bale loading devices exist that can aid a person in loading wagons and other transport vehicles in the field. The prior devices are generally more cumbersome, bulky, and complex than the present invention. The present invention provides for a less complex big bale loader, retriever, and transporter and provides an efficient tool that should save time and labor costs over other existing equipment.

The present invention, a loader, retriever, and transporter permits a novel lifting, rotating, and depositing of a bale from the ground in the field onto and across an elevating and flipping receiving table assembly mounted to the main frame of the transporter, consolidating of a plurality of lifted bales into a two-high, three-high, or four-high consolidated stack of bales on a stack carriage bed pivotally mounted to the main frame of the transporter, transporting of the consolidated stack to a storage location, tilting of the carriage bed to the rear, and depositing of the consolidated stack at the storage location.

BRIEF SUMMARY OF THE INVENTION

Another object of this invention is to provide a versatile transporter that selectively will lift, rotate, and deposit a bale lengthwise across an elevating and flipping receiving table; will flip the bale rearward onto a stack carriage bed assembly to be stopped by a left front load squeezer and a right front load squeezer when both the squeezers are in a closed position (as shown for example in FIGS. 1, 2, and 17) or will elevate and flip the bale onto a previously flipped bale on the bed assembly; will when the squeezers are in an open position (see FIGS. 8 and 12) move the flipped bale, set of two, three, or four flipped bales, or sets of flipped bales rearward on the bed assembly and towards and when there are sufficient intervening sets of flipped bales up against a left rear grapple bar and a right rear grapple bar that each have a plurality of grapple hooks that when the grapple bars are both in closed positions (see FIGS. 1, 2, 12, 17, 18, and 19) stop the bales from going backwards beyond the grapple bars; will anchor the second set of bales from the front of the bed assembly between a left front load squeezer spike and a right front load squeezer spike that will embed in a bale of the set; will repeat the foregoing steps selectively until a consolidated stack of a selected size is formed on the bed assembly; will selectively grip bales located on the bed assembly between a left front load squeezer and a right front load squeezer with the spikes embedded in any bales adjacent to the spikes (see FIG. 17); will then transport the consolidated stack to a chosen location; will then rotate the consolidated stack and the bed assembly upwards at the front of the bed assembly and downwards at the rear of the bed assembly (from a horizontal to a vertical position); will then open the left rear grapple bar (see FIG. 8), open the right rear grapple bar (see FIG. 8), will open the left front load squeezer (see FIGS. 8 and 12), and open the right front load squeezer (see FIGS. 8 and 12) thereby depositing and releasing the consolidated stack onto the surface of the chosen location; will then drive forward away from the deposited stack; will then rotate the bed assembly back from the vertical to the horizontal position; or will then be free to selectively stop right there, be used otherwise right there, return to the field for another load, drive elsewhere to retrieve a load, or back up and retrieve the just deposited load.

The present invention overcomes a significant problem that is encountered by many other loading devices. This significant problem is complex attachment to the wagon or vehicle. The present invention uses simple nuts and bolts and quick connect hydraulic lines to facilitate easy and reversible conversion of a preexisting vehicle such as a ten wheel truck into a big bale loader, retriever, and transporter.

Use of the big bale loader, retriever, and transporter in the field allows an operator to approach a big bale from its end, the same orientation as the bale obtained when deposited on the ground by the baler that formed the bale as the baler progressed along a similar track to that now taken by the transporter. A pickup arm assembly first receives each bale with its longitudinal axis parallel to the longitudinal axis of the transporter (along the course of advance of the transporter in the field); then the pickup arm assembly together with a swing gate assembly lifts and rotates the bale about three axis, and deposits the bale onto an elevating and flipping receiving table assembly of the transporter with the longitudinal axis of the bale after loading then being oriented perpendicular to and across the longitudinal axis of the transporter and parallel to the plane of the receiving table assembly.

With a ten wheel truck or similar vehicle that has been modified into the present invention, bales lying on their strings or on their edges in a field can be retrieved from the field and thereafter deposited in stable stacks again resting on their strings or again resting on their edges in a storage area. After deposit, the bales in the consolidated stack can be approached with the transporter from the same side accessed by the transporter when it deposited the bales and picked up as a consolidated stack and moved to another location.

The transporter in its preferred embodiment is mounted to the main frame of a preexisting ten wheel truck or other suitable vehicle. Preferably the invention is attached to the main frame using nuts and bolts.

The transporter in the preferred embodiment uses an electrically controlled, pressurized hydraulic system to selectively power and control fifteen hydraulic actuators connected to the hydraulic system by quick connect hydraulic lines. Each actuator requires the hook up of two hydraulic lines to the pressurized hydraulic system. Preferably, the hydraulic system is pressurized by a direct drive hydraulic pump mounted to the preexisting motor of the vehicle or truck. Alternatively, an auxiliary power unit could be used to power the hydraulic system. Preferably, the control of the invention's actuators is accomplished by use of conventional electric controls such as used on other agricultural equipment.

While the preferred embodiment uses hydraulic actuators, other comparable devices including pneumatic actuators could be used.

Additional and various other objects and advantages attained by the invention will become more apparent as the specification is read and the accompanying figures are reviewed.

DETAILED DESCRIPTION OF THE INVENTION

Figure 1:
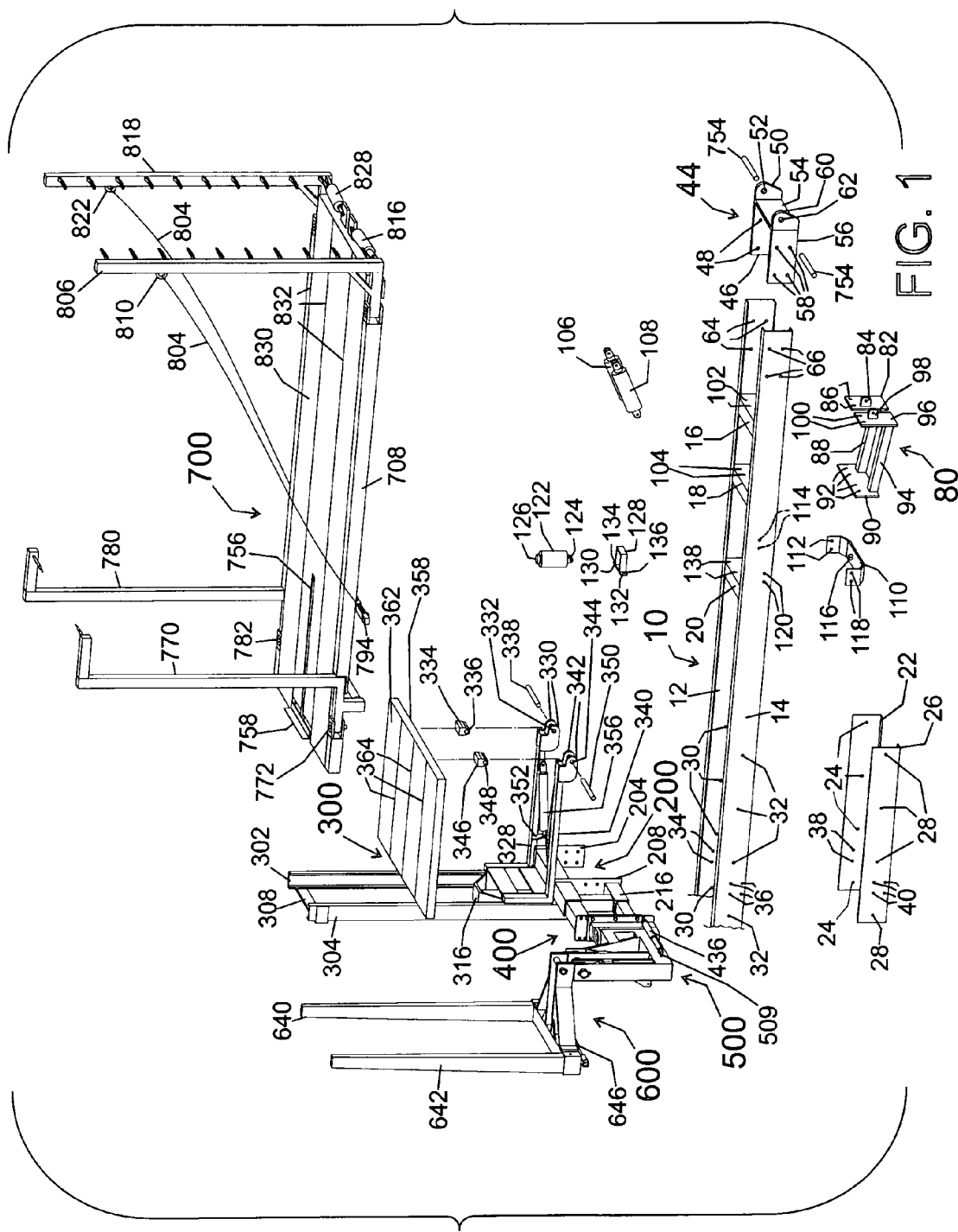
FIG. 1 is a perspective partially exploded view of a transporter showing the orientation of a pickup arm assembly to a swing gate assembly, to a mounting tube assembly, to a receiving tube assembly, to an elevating and flipping receiving table assembly, and to a stack carriage bed assembly and without showing the cab forward portions and without showing the drive line and associated drive line components and without showing the wheels and other wheel components and without showing electrical components and without showing hydraulic lines.

Referring to FIGS. 1 to 20, the present invention is novel and provides a big bale loader, retriever, and transporter 6. A method of using the transporter 6 provides for lifting, rotating, and depositing a bale on a receiving table of said transporter, consolidating of the bale with other bales into a consolidated stack of bales on a stack carriage bed of the transporter, transporting of the consolidated stack to a chosen location, and the depositing of the consolidated stack at the chosen location.

The transporter 6 in its preferred embodiment is a modified ten wheel truck having a cab 8 mounted forward on a longitudinal main frame 10. The main frame 10 has a longitudinal right frame channel 12 having a rearward open end spaced from and generally parallel to a left frame channel 14 also having a rearward open end. The channels 12 and 14 are connected to one another by a plurality of spaced frame cross members including a rearmost frame cross member 16 spaced forward away from the rearward open ends, a second rearmost frame cross member 18, and a third rearmost frame cross member 20.

Figure 2:
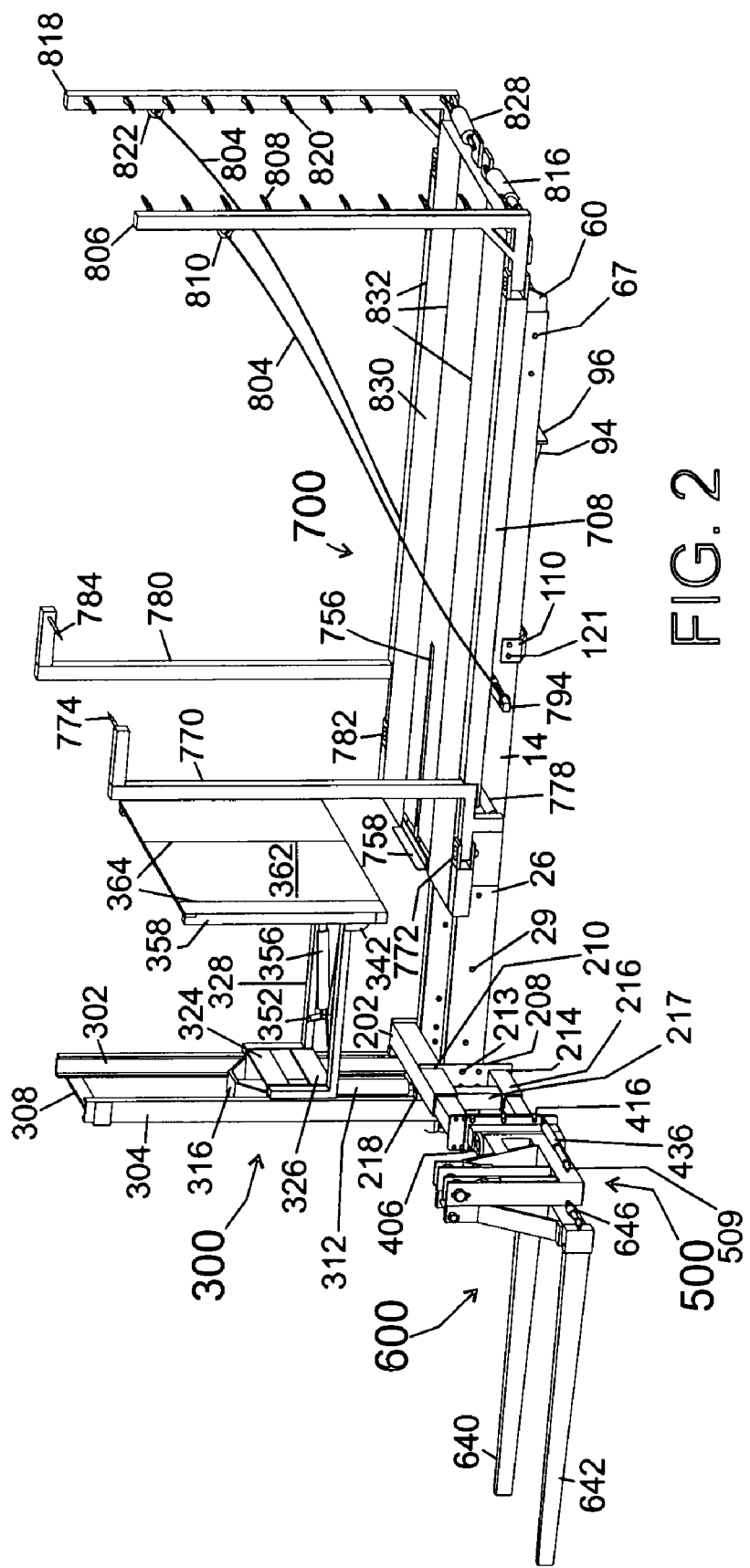
FIG. 2 is a perspective view of the transporter shown in FIG. 1 in a bale receiving position.

Reinforcing gloves can be used to strengthen the channels 12 and 14 as shown in FIGS. 1 and 2. Preferably, a right reinforcing glove 22 having a plurality of right reinforcing glove bolt holes 24 is attached to the right frame channel 12 using nuts and bolts through a plurality of right reinforcing glove cooperating bolt holes 30 in the right frame channel. Preferably, a left reinforcing glove 26 having a plurality of left reinforcing glove bolt holes 28 is attached to the left frame channel 14 using a plurality of nuts and a plurality of left reinforcing glove bolts 29 through a plurality of left reinforcing glove cooperating bolt holes 32 in the left frame channel.

A stack carriage bed mounting 44 is an integral H-shaped member attached between the rearward open ends of the channels 12 and 14 spaced rearward from the rearmost frame cross member 16 and preferably attached with nuts and bolts. Preferably, the stack carriage bed mounting 44 has a right lower leg 46 with at least one right lower leg bolt hole 48, a right upper leg 50 with a transverse stack carriage bed right main pivot pin hole 52, a connecting member 54, a left upper leg 60 with a stack carriage bed left main pivot pin hole 62, and a left lower leg 56 with at least one left lower leg bolt hole 58. Preferably, the bed mounting 44 is inserted between and attached to the right frame channel 12 and the left frame channel 14 at their rearward ends with nuts and at least one right lower leg cooperating bolt and at least one left lower leg cooperating bolt 67 through at least one right lower leg cooperating bolt hole 64 in the right frame channel and at least one left lower leg cooperating bolt hole 66 in the left frame channel. Preferably, the right main pivot pin hole 52 is spaced from and coaxial to the left main pivot pin hole 62.

A stack carriage bed main actuators frame mounting 80 is attached to the main frame 10 preferably using nuts and bolts. Preferably, the main actuators frame mounting 80 is attached to the rearmost frame cross member 16 and the second rearmost frame cross member 18 as best seen in FIG. 1. The frame mounting 80 has a right main actuator mounting plate 82 with a right main actuator mounting ear 84 attached to the rearward side of the right main actuator mounting plate and has at least one right main actuator mounting plate bolt hole 86. Preferably, the right main actuator mounting plate 82 is attached to the rearmost frame cross member 16 through at least one main actuator mounting plate cooperating bolt hole 102 in the rearmost frame cross member using nuts and bolts. A right strut 88 is attached between the forward side of the right main actuator mounting plate 82 and the rearward side of a hip plate 90. Preferably, the hip plate 90 has at least one hip plate bolt hole 92 and the hip plate is attached to the second rearmost frame cross member 18 through at least one hip plate cooperating bolt hole 104 in the second rearmost frame cross member using nuts and bolts. A left strut 94 is attached between the rearward side of the hip plate 90 and the forward side of a left main actuator mounting plate 96. The left main actuator mounting plate 96 has a left main actuator mounting ear 98 attached to the rearward side of the left main actuator mounting plate and preferably has at least one left main actuator mounting plate bolt hole 100. Preferably, the left actuator mounting plate 96 is attached to the rearmost frame cross member 16 through at least one main actuator mounting plate cooperating bolt hole 102 in the rearmost frame cross member using nuts and bolts.

A right main actuator 106 is connected between the right main actuator mounting ear 84 and a bed actuator mounting ear 738 and a left main actuator 108 is connected between the left main actuator mounting ear 98 and a second bed actuator mounting ear 738 by use of appropriate pins and clips.

Figure 12:
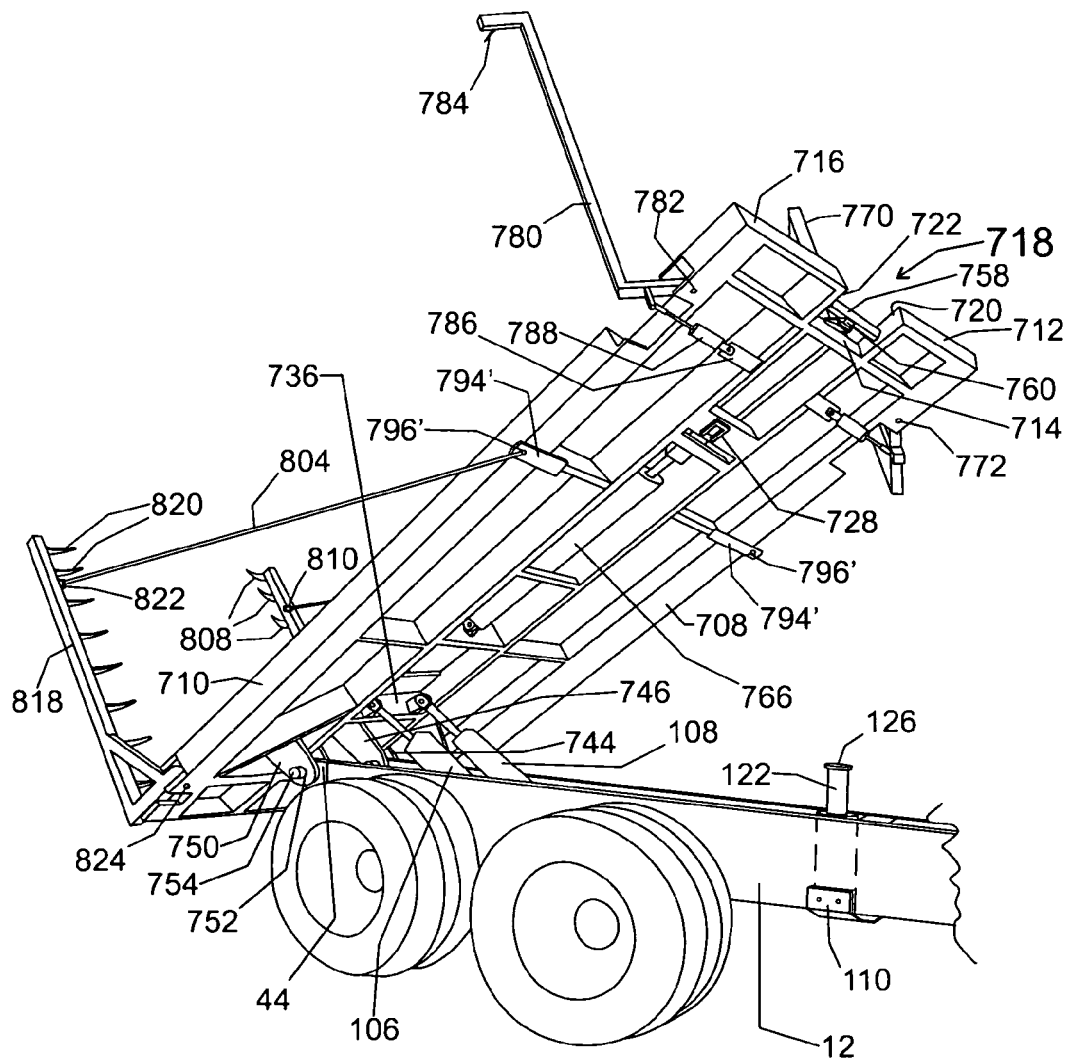
FIG. 12 is a perspective partial view of the transporter showing the carriage bed assembly in a transitional position about half way towards a fully raised position and here raised approximately 45 degrees from its horizontal resting position and showing a bed boost actuator partially extended upwards.
Figure 13:
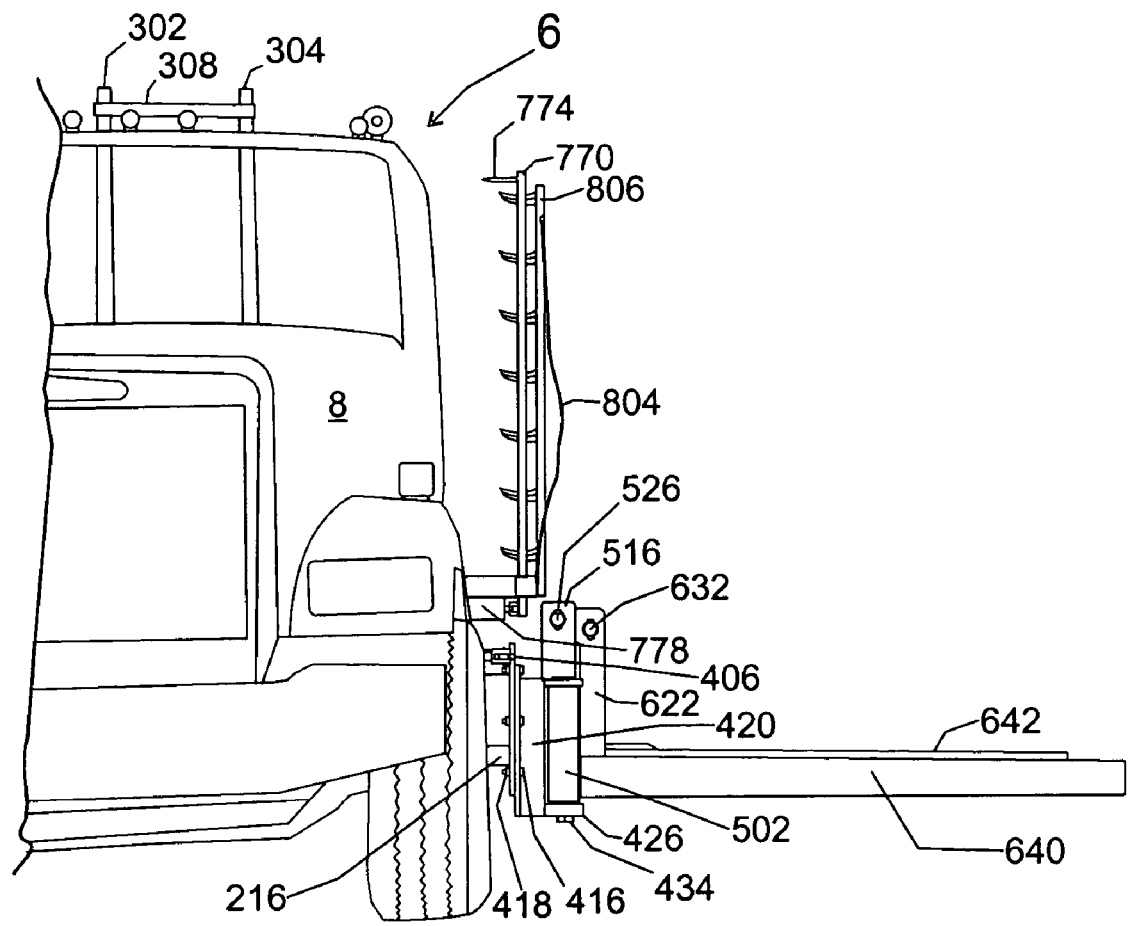
FIG. 13 is a partial front plan view showing the transporter and portions of the mounting tube assembly, the swing gate assembly, and the pickup arm assembly with the swing gate assembly and the pickup arm in a position rotated about 90 degrees about a swing gate pivot pin.
Figure 14:
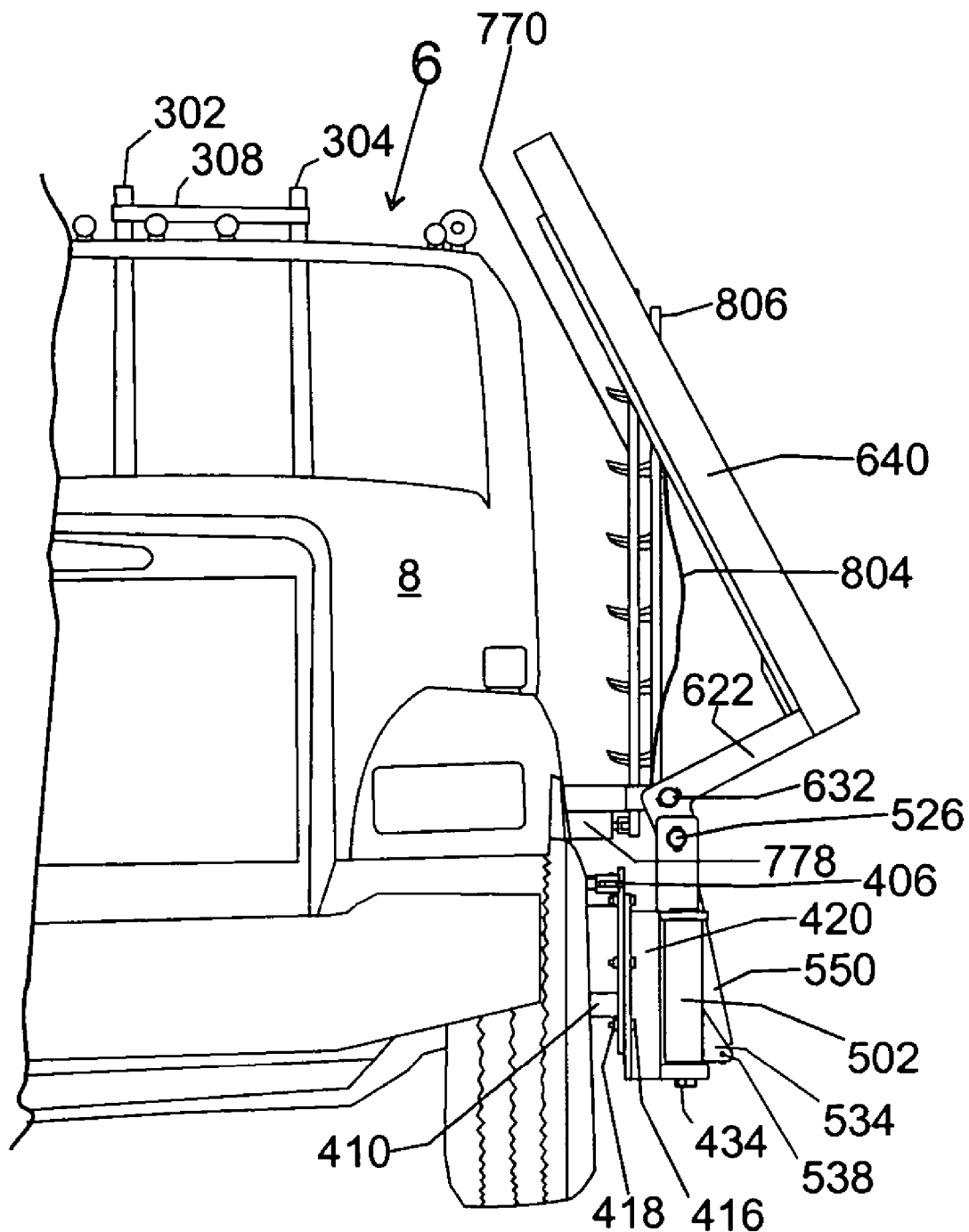
FIG. 14 is a partial front plan view showing the transporter and portions of the mounting tube assembly, the swing gate assembly, and the pickup arm assembly with the swing gate assembly and the pickup arm in a position rotated about 90 degrees about a swing gate pivot pin and the pickup arm assembly lifted up about 100 degrees in transition towards a bale depositing position from its bale receiving position.
Figure 15:
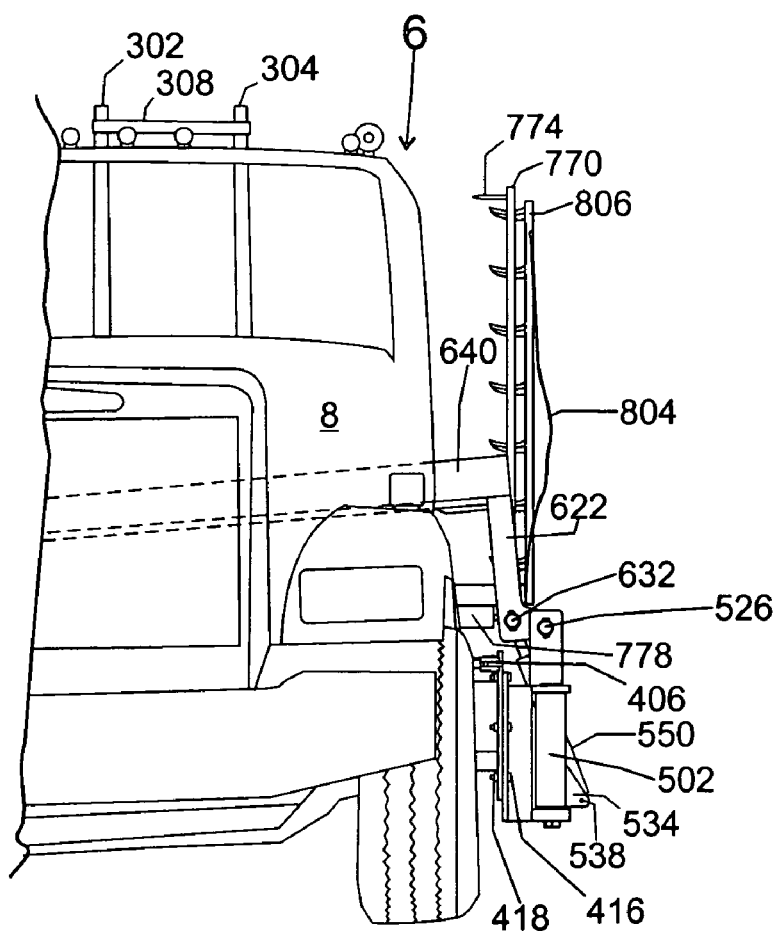
FIG. 15 is a partial front plan view showing the transporter and portions of the mounting tube assembly, the swing gate assembly, and the pickup arm assembly with the swing gate assembly and the pickup arm in a position rotated about 90 degrees about a swing gate pivot pin and the pickup arm assembly lifted up about 185 degrees to a bale depositing position from its bale receiving position.
Figure 16:
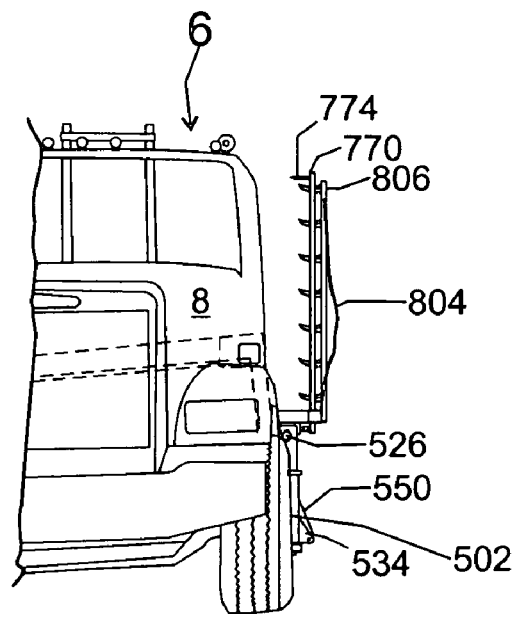
FIG. 16 is a partial front plan view showing the transporter and portions of the swing gate assembly, and the pickup arm assembly with the swing gate assembly and the pickup arm in a position rotated about 90 degrees about a swing gate pivot pin and the pickup arm assembly lifted up about 185 degrees to a bale depositing position from its bale receiving position; and with the swing gate assembly and the pickup arm assembly retracted to a stowed position by the receiving tube assembly and the mounting tube assembly not shown.
Figure 17:
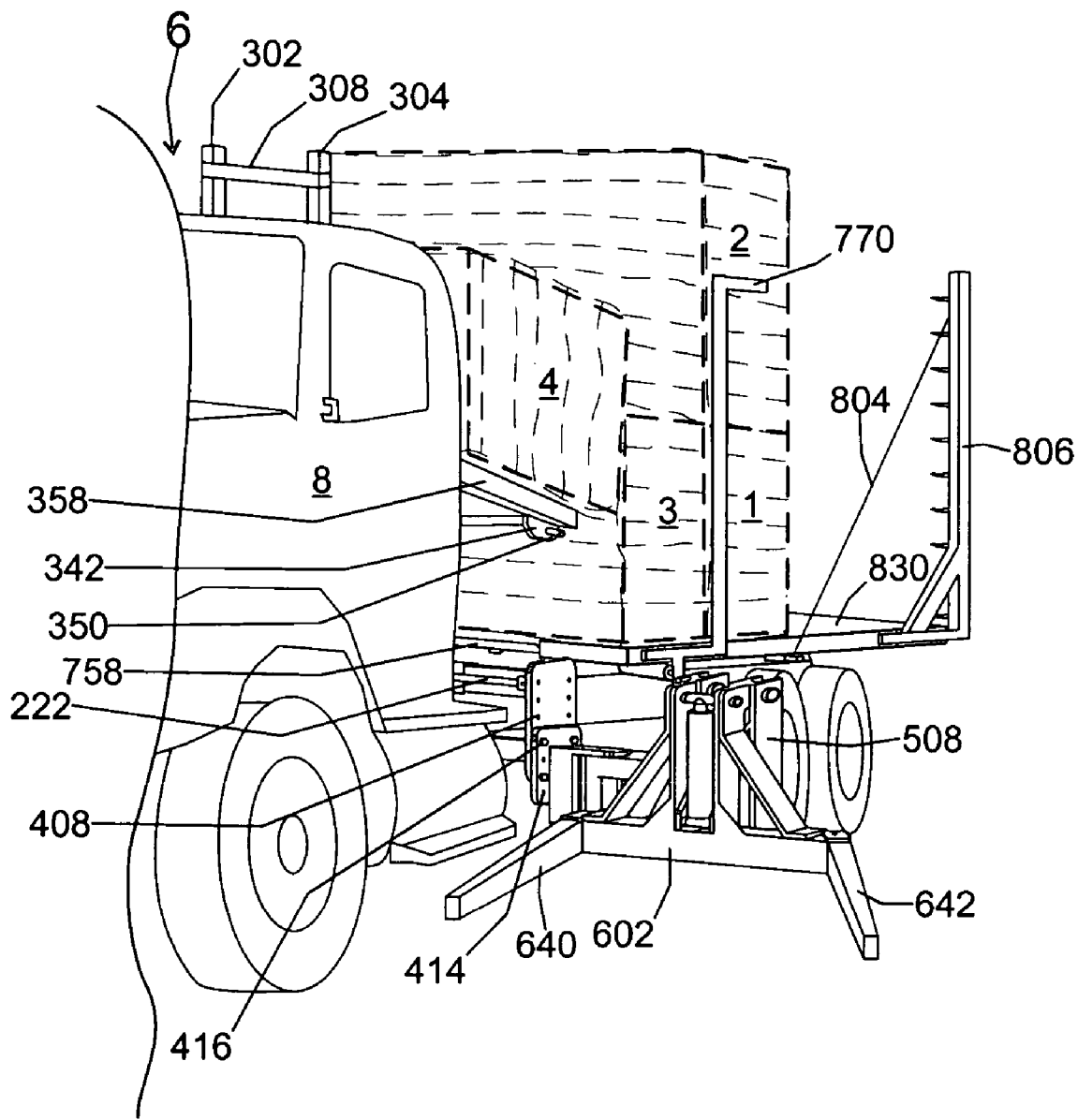
FIG. 17 is a perspective partial view of the transporter showing portions of the receiving table assembly in the process of elevating and flipping a bale 4 for flipping up onto a bale 3 (the first bale in a second set of two bales) adjacent to a first set of bales 1 and 2 on the carriage bed assembly, showing the left front load squeezer in a closed position against the bales 1 and 2 and behind the bale 3, and showing the pickup arm assembly in a bale receiving position.

A boost bed actuator hanger 110 has at least one right hanger bolt hole 112, a boost bed actuator ear 116 on its upper surface, and at least one left hanger bolt hole 118. The boost bed actuator hanger 110 is attached below and between the channels 12 and 14 and near the third rearmost frame cross member 20 using nuts and bolts with at least one right hanger cooperating bolt hole 114 in the right frame channel, at least one right hanger cooperating bolt, at least one left hanger cooperating bolt hole 120 in the left frame channel, and at least one left hanger cooperating bolt 121 as best seen in FIGS. 1 and 12.

A boost bed actuator 122 with a lower boost bed actuator connector 124 and having an upper boost bed actuator lift pad 126 is connected to the boost bed actuator ear 116 by use of an appropriate pin and clip and is oriented generally vertically upward and through a boost bed actuator restraining collar 128 having at least one restraining collar mounting flange 130 or 132 with each mounting flange having at least one mounting flange bolt hole 134 or 136 transverse through each for attachment using nuts and bolts with at least one mounting flange cooperating bolt hole 138 in the third rearmost frame cross member 20. Preferably, the boost bed actuator 122 is mounted so that the actuator lift pad 126 is located near or above the upper plane of the frame channels 12 and 14 when the actuator is retracted and located well above the upper plane when the actuator is extended.

A receiving tube assembly 200 is attached to the main frame 10 spaced forward away from the rearmost frame cross member 16 using nuts and bolts. Preferably, the receiving tube assembly 200 is mounted across the right frame channel 12 and the left frame channel 14 behind the cab 8 using nuts and bolts. The receiving tube assembly 200 has a main receiving tube 202 attached preferably by welding at its right end to a right mounting plate 204. The right mounting plate 204 depends downward along the outward side surface of the right channel 12 and the right mounting plate has at least one right mounting plate bolt hole 206 used with nuts and bolts to attach the right mounting plate to the right frame channel 12 through at least one right mounting plate cooperating bolt hole 34 in the right frame channel. If a right reinforcing glove 22 is incorporated into the transporter 6, then the right mounting plate 204 is also attached through at least one right mounting plate cooperating bolt hole 38 in the right reinforcing glove.

A left mounting plate 208 preferably has a slot 210 for receiving the main receiving tube 202 and the left mounting plate is attached preferably by welding to a portion of the main receiving tube spaced from and parallel to the right mounting plate 204. The main receiving tube 202 preferably extends outward beyond the left frame channel 14 and the main receiving tube has a receiving tube assembly extension actuator ear 220 attached to its front side preferably outboard from the left channel 14. A receiving tube assembly extension actuator 222 is attached to the extension actuator ear 220.

The left mounting plate 208 has at least one left mounting plate bolt hole 212 used with nuts and at least one left mounting plate bolt 213 to attach the left mounting plate to the left frame channel 14 through at least one left mounting plate cooperating bolt hole 36 in the left frame channel. If a left reinforcing glove 26 is incorporated into the transporter 6, then the left mounting plate 208 is also attached through at least one left mounting plate cooperating bolt hole 40 in the left reinforcing glove. The left mounting plate 208 preferably depends downward along the outside of the left channel 14 and has a portion that extends below the left channel and in that portion is an aperture 214 for receiving and mounting preferably by welding a secondary receiving tube 216. The secondary receiving tube 216 is preferably spaced from, parallel to and below the main receiving tube 202 and extends outward away from the left channel 14. Preferably a receiving tube connecting brace 217 is attached between a portion of the main receiving tube 202 and a portion of the secondary receiving tube 216 with both the portions located outward away and separated from the left mounting plate 208.

Preferably, two spacer blocks 218 are spaced from one another and each block is attached to the forward surface of the main receiving tube 202 preferably by welding. Preferably, the spacer blocks 218 rest on the top surfaces of the channels 12 and 14.

An elevating and flipping receiving table assembly 300 is attached to the spacer blocks 218 preferably by welding. In the best embodiment, the table assembly 300 is attached to the spacer blocks 218, but alternatively, the table assembly can be attached to the forward surface of the main receiving tube 202 in the vicinity and above the frame channels 12 and 14.

The table assembly 300 includes a right mast channel 302 spaced from and parallel to a left mast channel 304 that both depend upward vertically and preferably with the right mast channel overlying the right frame channel 12 and the left mast channel overlying the left frame channel 14. The mast channels 302 and 304 preferably are attached to a respective spacer block 218 by welding and the mast channels are connected at their lower ends by a mast base 306 that spans between the lower ends. Preferably near the upper ends of the mast channels 302 and 304 is a mast cross brace 308 attached between the mast channels.

Figure 3:
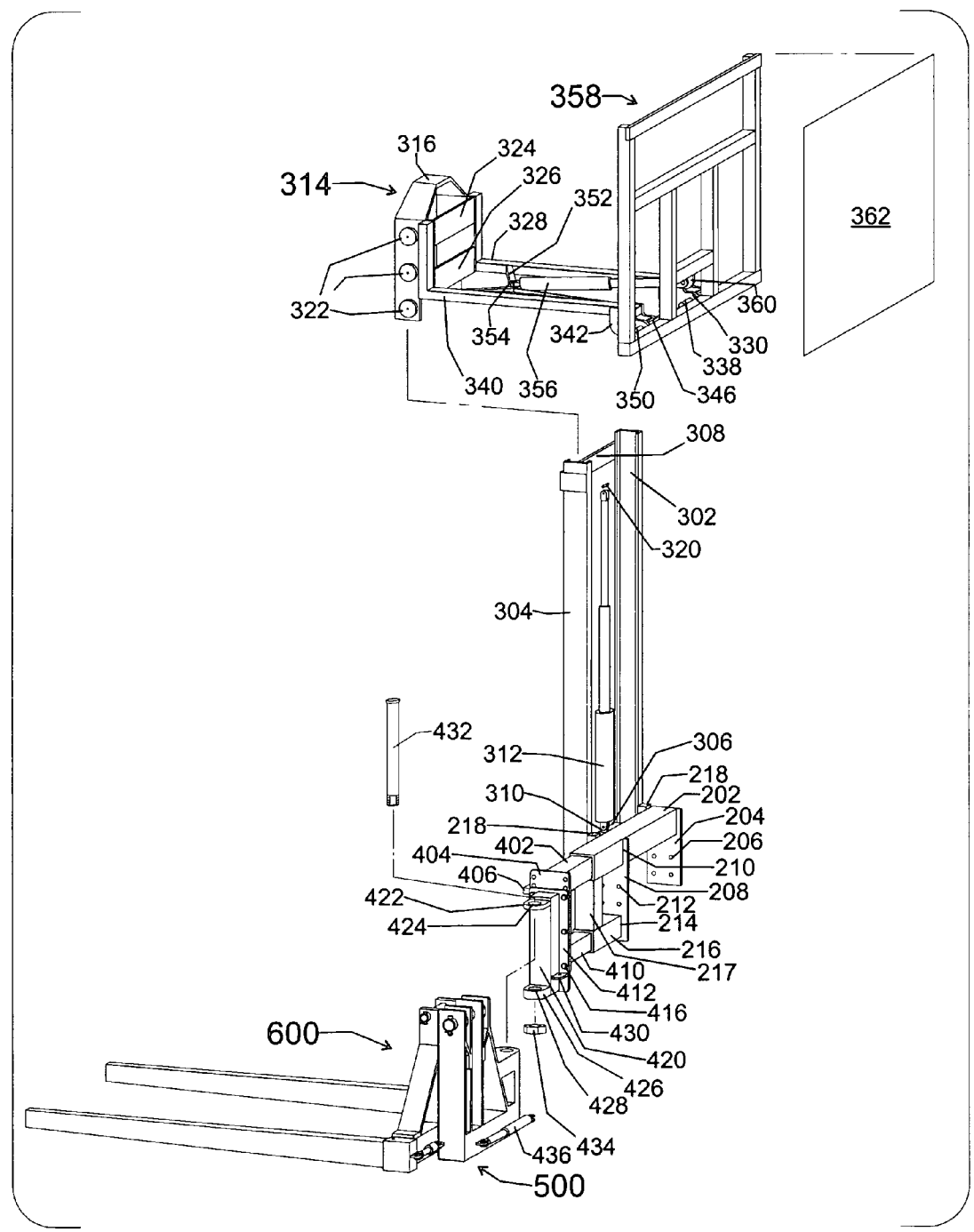
FIG. 3 is a perspective partially exploded view of a receiving tube assembly, an elevating and flipping receiving table assembly, a mounting tube assembly, a swing gate assembly, and a pickup arm assembly, with the pickup arm assembly in a deployed bale receiving position.
Figure 4:
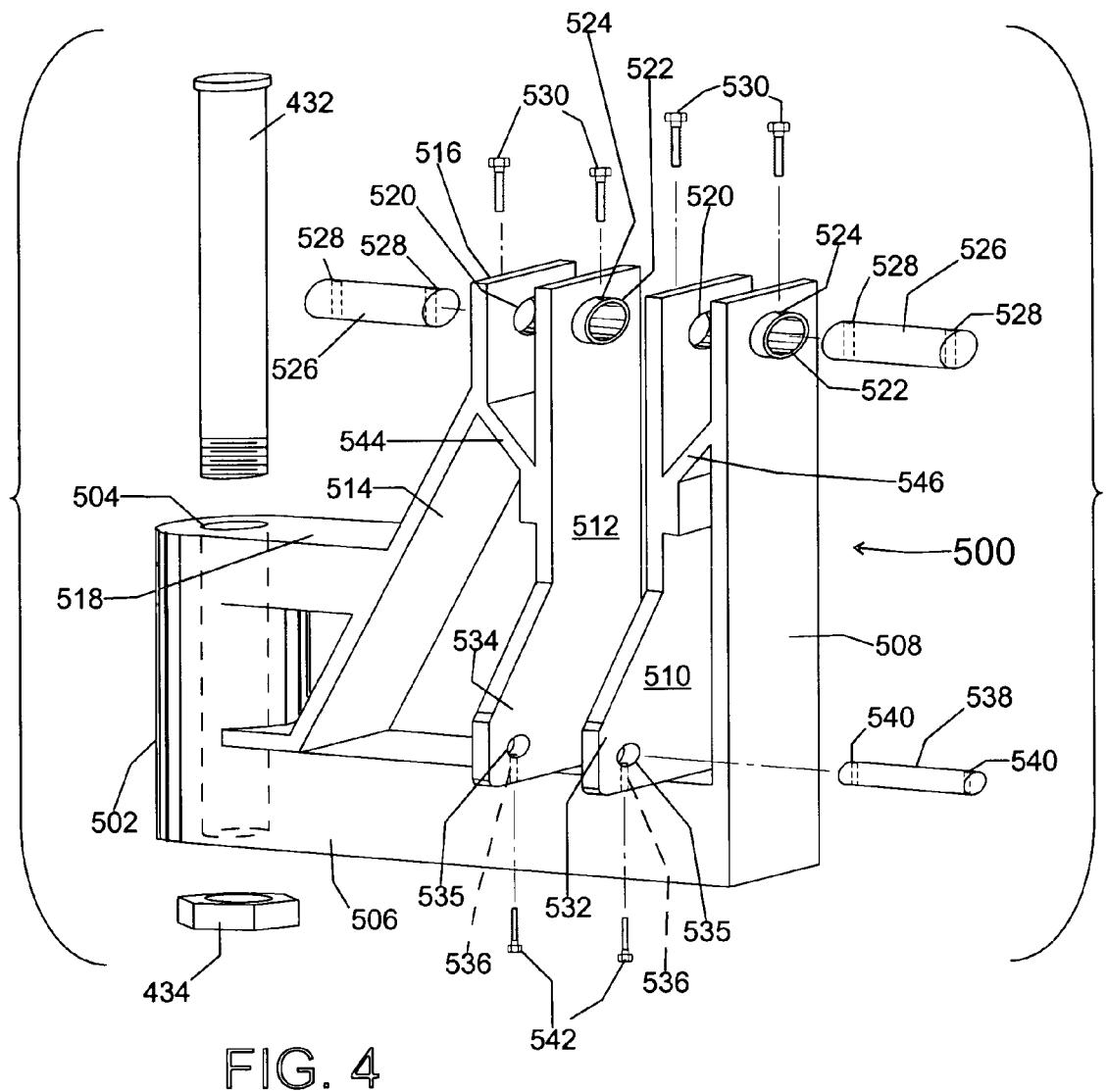
FIG. 4 is a perspective partially exploded view of the swing gate assembly of the transporter.
Figure 5:
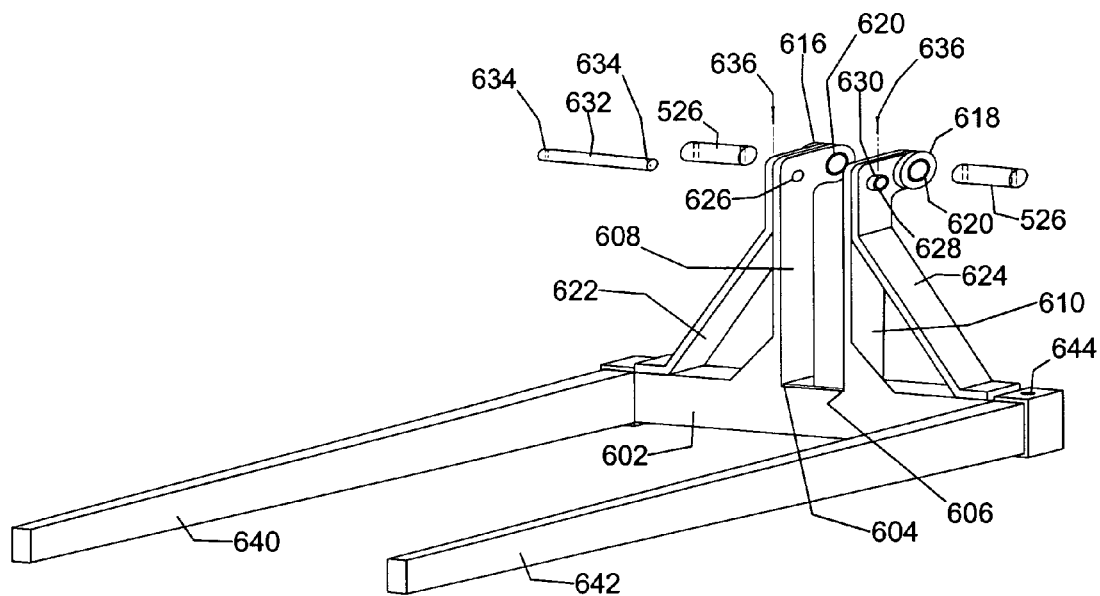
FIG. 5 is a perspective partially exploded view of the pickup arm assembly of the transporter.
Figure 6:
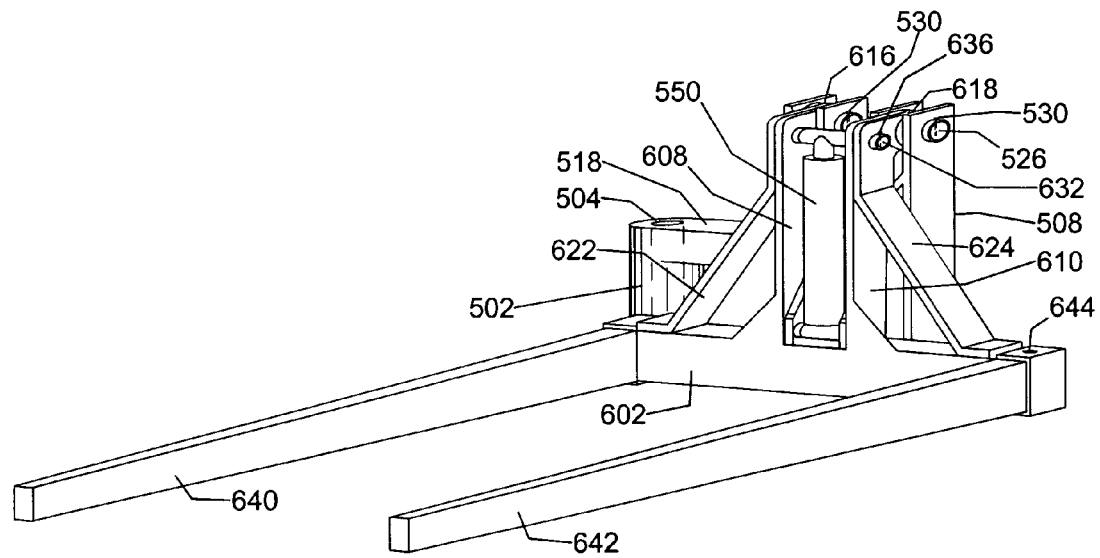
FIG. 6 is a perspective view of the swing gate assembly assembled together with the pickup arm assembly of the transporter.

The table assembly 300 further comprises a mast carriage assembly 314 that rides up and down in the space between the mast channels 302 and 304 and portions of the mast carriage assembly extend to the rear beyond the rear sides of the mast channels. As best seen in FIG. 3, the mast carriage assembly 314 comprises a mast carriage frame 316 located between the mast channels 302 and 304. The mast carriage frame 316 preferably includes three walls: an upper wall connected to two spaced and parallel side walls with a portion of each side wall extending beyond the rear sides of the mast channels 302 and 304. A mast carriage frame actuator ear 318 is attached to the lower surface of the upper wall of the carriage frame 316 at a point vertically above the mast base actuator ear 310.

A mast base actuator ear 310 is attached to the upper surface of the mast base 306 near its midpoint and a receiving table elevating actuator 312 is connected to the mast base actuator ear and the mast carriage frame actuator ear 318. Preferably, an actuator pivot pin 320 is used to connect the upper connection of the receiving table elevating actuator 312 to the mast carriage frame actuator ear 318.

The mast carriage frame 316 further preferably includes a plurality of mast carriage rollers 322 mounted to the outer surfaces of the side walls of the carriage frame and the rollers are sized and arranged and distributed to freely roll against and interact with the inside walls of the mast channels 302 and 304 to facilitate and control the mast carriage frame movement up and down along the vertical line of the mast channels. Preferably, an upper mast carriage frame cross brace 324 above and a lower mast carriage frame cross brace 326 below are each connected between the two side walls to reinforce the carriage frame 316.

The mast carriage assembly 314 further comprises a right fork 328 attached preferably by welding to the mast carriage frame 316 with the right fork overlying and generally parallel to the right channel 12 and extending towards the rear of the transporter 6, a pair of right fork hinge ears 330 attached to the outer end of the right fork 328 and each hinge ear having a right fork hinge ear aperture 332 coaxial to the hinge ear aperture in the other hinge ear, and a right fork pivot sleeve 334 having a right fork pivot sleeve bore 336 sized to be rotatably received and retained between the right fork hinge ears 330 and retained there by a right fork pivot pin 338 inserted into and through the right fork hinge ear apertures and the right fork pivot sleeve bore.

The mast carriage assembly 314 further comprises a left fork 340 attached preferably by welding to the mast carriage frame 316 with the left fork overlying and generally parallel to the left channel 14 and extending towards the rear of the transporter 6, a pair of left fork hinge ears 342 attached to the outer end of the left fork 340 and each hinge ear having a left fork hinge ear aperture 344 coaxial to the hinge ear aperture in the other hinge ear, and a left fork pivot sleeve 346 having a left fork pivot sleeve bore 348 sized to be rotatably received and retained between the left fork hinge ears 342 and retained there by a left fork pivot pin 350 inserted into and through the left fork hinge ear apertures and the left fork pivot sleeve bore.

The mast carriage assembly 314 further comprises a table tilting actuator mounting frame 352 preferably X-shaped attached to and between the forks 328 and 340, an actuator mounting frame actuator ear 354 attached to the actuator mounting frame 352 at a point on the mounting frame below and preferably equidistant from each fork and preferably closer to the carriage frame 316 than to the hinge ears 330 and 342 and preferably along the vertical plane that intersects the longitudinal axis of the transporter 6.

The mast carriage assembly 314 further comprises a receiving table frame 358 hinged along its rearward edge and attached along that rearward edge to the two fork pivot sleeves 334 and 346, a receiving table actuator ear 360 attached to the table frame 358 at a point of the table frame separated away from the hinged edge and above the level of the frame actuator ear 354 as shown in FIG. 3, a receiving table top surface skin 362 attached to the upper surface of the table frame 358 and preferably the table top surface skin having a plurality of spaced and parallel receiving table bale guiding ridges 364 extending above the table top surface skin and aligned parallel to the longitudinal axis of the transporter 6.

The mast carriage assembly 314 further comprises a table tilting actuator 356 is connected between the frame actuator ear 354 and the table actuator ear 360 by use of appropriate pins and clips with the tilting actuator aligned along the longitudinal axis of the transporter 6 and angled to extend at an upward angle from the horizontal plane of the transporter. Preferably, the table frame 358 can be raised from a horizontal bale receiving position to a flipping position beyond vertical (greater than 90 degrees) and returned to the bale receiving position by using the tilting actuator 356.

A mounting tube assembly 400 is adjustably and slidingly received and retained within the receiving tube assembly 200. In the best embodiment, the mounting tube assembly 400 comprises a main nesting tube 402 at one end attached to a mounting tube connecting plate 404 and the connecting plate attached on that same side to a secondary nesting tube 410 spaced from and parallel to the main nesting tube. The free end of the main nesting tube 402 is adjustably and slidingly received and retained within the main receiving tube 202 and the free end of the secondary nesting tube 410 is adjustably and slidingly received and retained within the secondary receiving tube 216. Preferably, the mounting tube assembly 400 further comprises a mounting tube connecting plate actuator ear 406 attached to the connecting plate 404 and the connecting plate has a plurality of connecting plate bolt holes 408.

Figure 18:
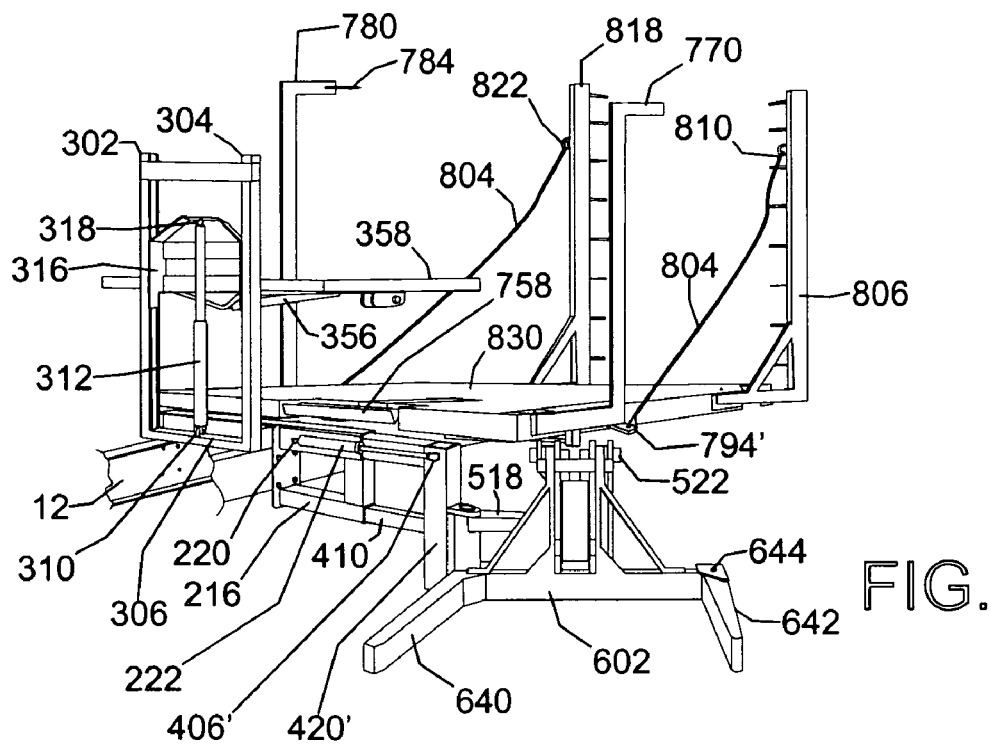
FIG. 18 is a perspective partial view of the transporter showing an alternative mounting tube assembly with the alternative mounting tube assembly extended outward by the receiving tube assembly extension actuator.
Figure 19:
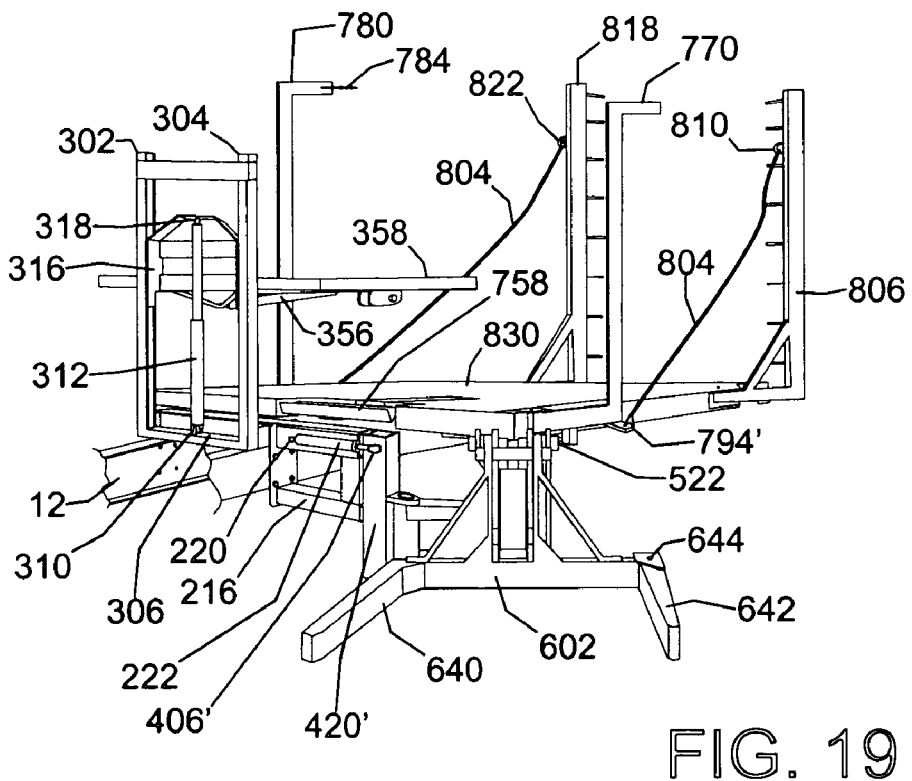
FIG. 19 is a perspective partial view of the transporter showing the alternative mounting tube assembly shown in FIG. 18 with the alternative mounting tube assembly retracted inward by the receiving tube assembly extension actuator.

In the best embodiment, the receiving tube assembly extension actuator 222 is connected between the extension actuator ear 220 and the mounting tube connecting plate actuator ear 406 by appropriate pins and clips to allow lateral adjustment of the mounting tube assembly 400 in and out of the receiving tube assembly 200. As shown in FIGS. 18 and 19, in an alternative embodiment, the extension actuator 222 can be connected between the extension actuator ear 220 and a vertical swing gate tube actuator ear 406' attached to the front surface of an alternative vertical swing gate tube 420'.

Preferably, the mounting tube assembly 400 further comprises a vertical adjustment plate 412 is sized and shaped similarly to the connecting plate 404 and having a plurality of connecting plate cooperating bolt holes 414 and attached to the connecting plate by a plurality of connecting plate bolts 416 and a plurality of connecting plate nuts 418, a vertical swing gate bracket tube 420 attached to the side of the vertical adjustment plate 412 away from the connecting plate 404; an upper swing gate bracket 422 having an upper swing gate bracket bore 424 attached to the side of the bracket tube away from the transporter 6 and a lower swing gate bracket 426 having a lower swing gate bracket bore 428 attached to the bracket tube spaced below and parallel to the upper swing gate bracket and a swing gate bracket tube actuator ear 430 attached to the back surface of the bracket tube 420.

A swing gate pivot pin 432 is sized to be received and retained in the bracket bores 424 and 428 and is threaded at its bottom end to receive a swing gate pivot pin retaining nut 434.

A swing gate assembly 500 is pivotally connected to the mounting tube assembly 400. Preferably, a vertical bearing pipe 502 of the swing gate assembly 500 is pivotally connected and retained by the swing gate pivot pin 432 within and between the swing gate brackets 422 and 426 and preferably secured by the swing gate pivot pin retaining nut 434.

The swing gate assembly 500 comprises a vertical bearing pipe 502 having a vertical bearing pipe bore 504, a horizontal gate member 506 attached preferably by welding to the lower portion of the vertical bearing pipe and preferably the horizontal gate member is perpendicular to the vertical bearing pipe, an outermost vertical shoulder pivot support member 508 attached to the outer end of the horizontal gate member and depending upwardly, a swing gate actuator ear 509 attached preferably to the back surface of the horizontal gate member and preferably near the outermost vertical shoulder pivot support member, a second outermost vertical shoulder pivot support member 510 attached to the horizontal gate member and depending upwardly and spaced from and parallel to the outermost vertical shoulder pivot support member, a third outermost vertical shoulder pivot support member 512 attached to the horizontal gate member and depending upwardly and spaced from and parallel to the second outermost vertical shoulder pivot support member, and a fourth outermost vertical shoulder pivot support member 514 having an upper portion 516 spaced from and parallel to the third outermost vertical shoulder pivot support member and a lower portion angled toward the vertical bearing pipe attached to the horizontal gate member near the vertical bearing pipe.

A swing gate assembly actuator 436 is connected between the bracket tube actuator ear 430 and the swing gate actuator ear 509 (see FIGS. 1 and 2) by use of appropriate pins and clips. In an alternative embodiment, the swing gate assembly actuator 436 can be connected between an alternative bracket tube actuator ear 430' and the swing gate actuator ear 509.

Preferably, the swing gate assembly 500 further comprises an upper horizontal brace 518 attached between the upper end of the vertical bearing pipe 502 and the fourth outermost vertical shoulder pivot support member 514. Preferably, bronze bushings are used in the bearing pipe bore 504.

Preferably, the swing gate assembly 500 further comprises four coaxial shoulder pivot pin bores 520 with one shoulder pivot support bore in each pivot support member 508, 510, 512, and 514 and preferably spaced and parallel to the longitudinal axis of the horizontal gate member 506 and four shoulder pivot pin collars 522 attached one to each vertical shoulder pivot support member coaxial with the adjacent shoulder pivot pin bore with one collar on the inboard side of the fourth outermost vertical shoulder pivot support member closest to the vertical bearing pipe 502, with one collar on the outboard side of the outermost vertical shoulder pivot support member, with one collar on the side of the third outermost vertical shoulder pivot support member closest to the second outermost vertical shoulder pivot support member, and with one collar on the side of the second outermost vertical shoulder pivot support member closest to the third outermost vertical shoulder pivot support member.

Preferably, the swing gate assembly 500 further comprises a shoulder pivot pin collar transverse bore 524 in each shoulder pivot pin collar 522 and two shoulder pivot pins 526 with each shoulder pivot pin preferably having a threaded shoulder pivot pin transverse bore 528 near each end of each shoulder pivot pin, and a shoulder pivot pin retention bolt 530 received and retained in each shoulder pivot pin transverse bore.

The swing gate assembly 500 further comprises two extending lower portions 532 and 534 of the second and third outermost vertical shoulder pivot support members 510 and 512 preferably extending forward in the same vertical planes as their respective support member and perpendicularly through a vertical plane located along the right side of the horizontal gate member 506 when viewed from the vertical axis of the vertical bearing pipe 502 and viewing outward along the length of the horizontal gate member.

The swing gate assembly 500 further comprises two coaxial ankle pivot pin bores 535 with one in each extending lower portion 532 and 534 and spaced from and parallel to the longitudinal axis of the horizontal gate member 506; two intersecting bores 536 with one respectively formed up vertically through each lower edge of the respective extending lower portions 532 and 534 and intersecting respective ankle pivot pin bores; and an ankle pivot pin 538 with the ankle pivot pin received and retained in the ankle pivot pin bores and with the ankle pivot pin having preferably two ankle pivot pin transverse bores 540 (preferably threaded) with one near each end of the ankle pivot pin 538 with each receiving and retaining a cooperating ankle pivot pin retention bolt 542 threaded through the respective intersecting bore 536.

Preferably, the swing gate assembly 500 further comprises a first connecting brace 544 attached between a portion of the third outermost vertical shoulder pivot support member 512 and a portion of the fourth outermost vertical shoulder pivot support member 514 with both the portions located away and below the shoulder pivot pin bore 520 in each respective support member.

Preferably, the swing gate assembly 500 further comprises a second connecting brace 546 attached between a portion of the outermost vertical shoulder pivot support member 508 and a portion of the second outermost vertical shoulder pivot support member 510 with both the portions located away and below the shoulder pivot pin bore 520 in each respective support member.

The pickup arm assembly 600 comprises a horizontal crossbeam tube 602, two first lower ends 604 and 606 of two inverted, spaced, parallel, and identically L-shaped arm supports 608 and 610 with each first lower end attached to the horizontal crossbeam tube and spaced about the mid-length point of the horizontal crossbeam tube preferably to enable the extending portions 532 and 534 to be received there between, two upper ends of the arm supports attached each respectively to a separate shoulder pivot pin bearing pipe 616 and 618 with the shoulder pivot pin bearing pipes spaced from and coaxial to one another and preferably with each pin bearing pipe having within a shoulder pivot pin bronze bushing 620 with each said shoulder pivot pin bearing pipe and bushing sized to receive and rotatably retain within one shoulder pivot pin 526.

Preferably, the pickup arm assembly 600 further comprises an inwardly disposed angled pickup arm brace 622 attached between the horizontal crossbeam tube 602 near its inward end and the upper elbow portion of the inwardly disposed arm support 608 and preferably attached to the shoulder pivot pin bearing pipe 616.

Preferably, the pickup arm assembly 600 further comprises an outwardly disposed angled pickup arm brace 624 attached between the horizontal crossbeam tube 602 near its outward end and the upper elbow portion of the outwardly disposed arm support 610 and preferably attached to the shoulder pivot pin bearing pipe 618.

The pickup arm assembly 600 further comprises two coaxial elbow pivot pin bores 626 with one elbow pivot pin bore in and through each said arm support 608 and 610 and in and through the adjacent respective pickup arm braces 622 and 624.

Preferably, the pickup arm assembly 600 further comprises two elbow pin collars 628 attached one elbow pin collar to each pickup arm brace 622 and 624 respectively away from the respective arm supports 608 and 610 and with each elbow pin collar coaxial to the elbow pivot pin bores 626. Preferably, each elbow pin collar 628 has an elbow pin collar transverse bore 630.

The pickup arm assembly 600 further comprises an elbow pivot pin 632, with said elbow pivot pin received and retained in the elbow pivot pin bores 626. Preferably the elbow pivot pin 632 has two elbow pivot pin transverse bores 634 (preferably threaded) with one near each end of the elbow pivot pin to receive and retain a cooperating elbow pivot pin retention bolt 636 and is retained in the elbow pivot pin bores 626 by the threading of the elbow retention bolts through the respective elbow pin collars 628 through the respective elbow pin collar transverse bore 630 and into the respective elbow pivot pin transverse bore.

Figure 7:
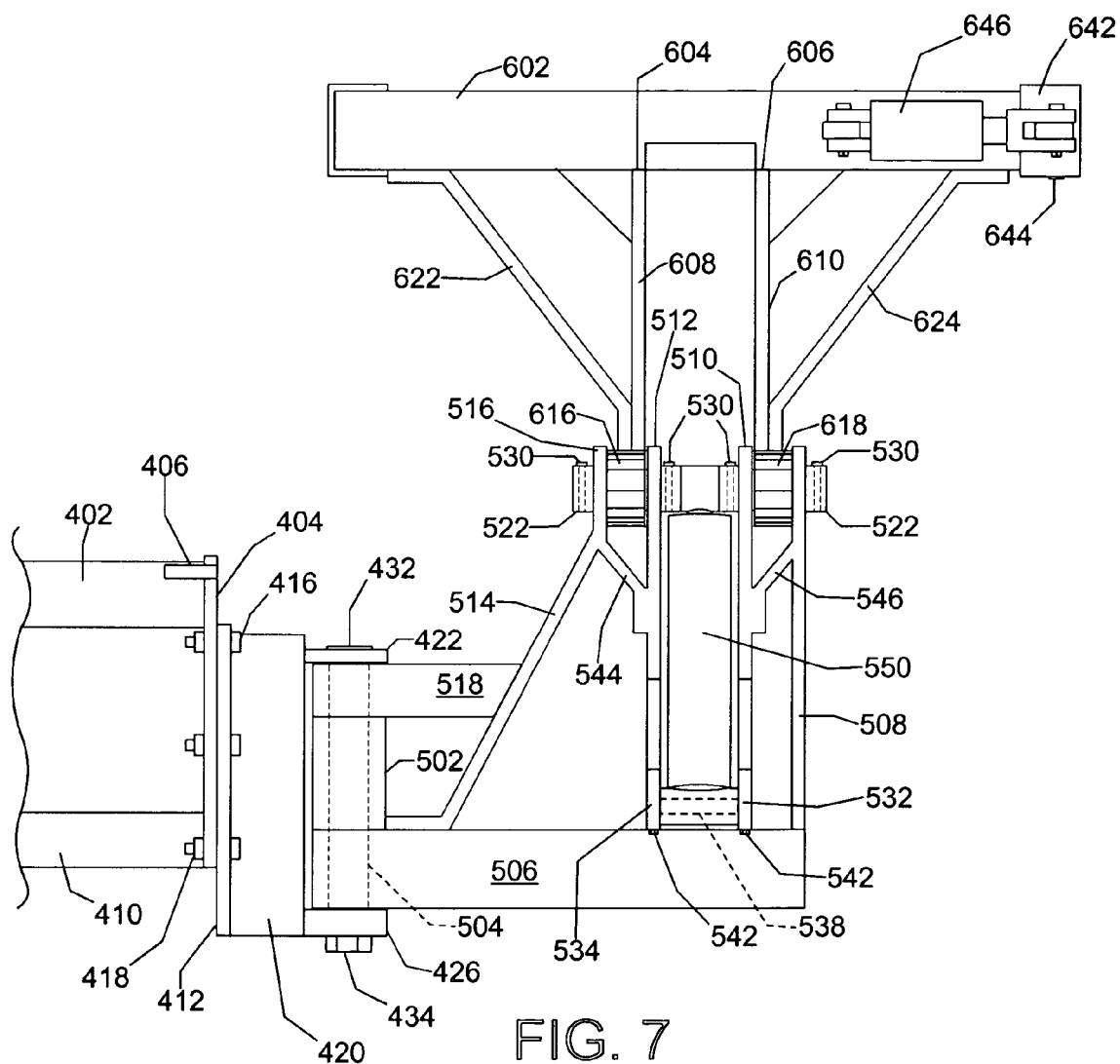
FIG. 7 is a front plan view of the pickup arm assembly in a raised position in relationship to the swing gate assembly of the transporter and showing the swing gate assembly pivotally connected to the mounting tube assembly by a swing gate pivot pin.

The pickup arm assembly 600 further comprises an inwardly disposed clamping arm 640 attached preferably by welding to the inward end of said horizontal crossbeam tube 602 and an outwardly disposed clamping arm 642 is pivotally connected to said horizontal cross beam tube by use of a clamping arm pivot pin 644. A clamping actuator 646 is connected between the horizontal cross beam tube 602 and the outwardly disposed clamping arm 642 as best shown in FIGS. 1 and 7 by use of pins and clips as well known in the art.

Preferably the two shoulder pivot pin bearing pipes 616 and 618 are received into cooperating and rotatable relationships with the swing gate assembly 500 with one shoulder pivot pin bearing pipe 616 rotatably mounted between the fourth outermost vertical shoulder pivot support member 514 and the third outermost vertical shoulder pivot support member 512 and retained there by one of the shoulder pivot pins 526 inserted into the shoulder pivot pin bores 520 of the fourth outermost vertical shoulder pivot support member and the third outermost vertical shoulder pivot support member and into the shoulder pivot pin bearing pipe 616 and with the other shoulder pivot pin bearing pipe 618 rotatably mounted between the outermost vertical shoulder pivot support member 508 and the second outermost vertical shoulder pivot support member 510 and retained there by one of the shoulder pivot pins 526 inserted into the shoulder pivot pin bores 520 of the outermost vertical shoulder pivot support member and the second outermost vertical shoulder pivot support member and into the shoulder pivot pin bearing pipe 618 and preferably with each shoulder pivot pin retained by use of shoulder pivot pin retention bolts 530 received and retained in each shoulder pivot pin transverse bore 528.

A pickup arm assembly 600 is pivotally connected to the swing gate assembly 500. Preferably, the pickup arm assembly 600 is pivotally connected to the swing gate assembly 500 by two shoulder pivot pins 526, the ankle pivot pin 538, and the elbow pivot pin 632. A pick up arm lifting actuator 550 having an upper connector and a lower connector is connected between the ankle pivot pin 538 and the elbow pivot pin 632 of the pickup arm assembly 600 by threading the elbow pivot pin through the upper connector before the elbow pivot pin is received and retained in the elbow pivot pin bores and by threading the ankle pivot pin through the lower connector before the ankle pivot pin is received and retained in the ankle pivot pin bores.

A stack carriage bed assembly 700 is pivotally connected to the stack carriage bed mounting 44 by two bed pivot pins 754 inserted in the main pivot pin holes 52 and 62. See FIGS. 1, 8, and 12. The stack carriage bed assembly 700 comprises a stack carriage bed frame 702 comprising a left main longitudinal frame member 704 spaced from and generally parallel to a right main longitudinal frame member 706 with the main longitudinal members preferably overlaying the right and left frame channels 12 and 14, a plurality of central cross members 730 attached between the left and right main longitudinal frame members and distributed from the front to the rear of the bed frame, a left outboard longitudinal frame member 708 spaced from and generally parallel to the left main longitudinal frame member, a plurality of left outboard cross members 732 attached between the left main longitudinal frame member 704 and the left outboard longitudinal frame member 708 and distributed from the front to the rear of the bed frame 702, a right outboard longitudinal frame member 710 spaced from and generally parallel to the right main longitudinal frame member, a plurality of right outboard cross members 734 attached between the right main longitudinal frame member 706 and the right outboard longitudinal frame member 710 and distributed from the front to the rear of the bed frame 702, a left front outboard cross member 712 attached at one end to the front end of the left outboard longitudinal frame member and at the other end to a left pullback notch member 720, the left pullback notch member is attached to a central front outboard cross member 714 that preferably crosses the longitudinal centerline of the bed frame, the central front outboard cross member is preferably attached across the front ends of the left main longitudinal frame member and the right main longitudinal frame member and attached to a right pullback notch member 722, the right pullback notch member is attached to a right front outboard cross member 716, the right front outboard cross member is attached to the front end of the right outboard longitudinal frame member, and a rear outboard cross member 724 is preferably attached to the rearward ends of the longitudinal frame members 704, 706, 708, and 710.

Preferably, the bed frame 702 further comprises a boost bed action pad cross member 726 attached between the left and right main longitudinal frame members 704 and 706 and preferably located about one third of the way back from the front boundary to the rear boundary of the bed frame and a boost bed action pad 728 attached to the pad cross member and aligned to interact in a jacking relationship with the boost bed actuator lift pad 126.

The bed frame 702 further comprises a bed actuator mounting 736 preferably having two bed actuator mounting ears 738 attached to the underside of the bed assembly 700 and attached between the left and right main longitudinal frame members 704 and 706 and preferably located about one quarter of the way forward from the back boundary to the front boundary of the bed frame.

Preferably, the bed frame 702 further comprises a left diagonal brace 740 attached between the left main longitudinal frame member 704 and the left outboard longitudinal frame member 708 and located towards the rear of the bed frame and a right diagonal brace 742 attached between the right main longitudinal frame member 706 and the right outboard longitudinal frame member 710 and located towards the rear of the bed frame.

The bed frame 702 further comprises a left outer bed pivot mount 744 having a bed pivot pin bore 752 attached to the outboard side of left main longitudinal frame member 704; a left inner bed pivot mount 746 having a bed pivot pin bore 752 is attached to inboard side of left main longitudinal frame member 704; a right inner bed pivot mount 748 having a bed pivot pin bore 752 is attached to inboard side of right main longitudinal frame member 706; and a right outer bed pivot mount 750 having a bed pivot pin bore 752 is attached to outboard side of right main longitudinal frame member 706. Preferably, each bed pivot mount 744, 746, 748, and 750 is located about one eighth of the way forward from the back boundary to the front boundary of the bed frame.

Preferably, the four bed pivot pin bores 752 are coaxial and perpendicular to the longitudinal axis of the bed frame 702 and in a plane spaced from and parallel to the plane of the surface on which the transporter 6 rests and the bed pivot pin bores are sized to receive and rotatably retain a bed pivot pin 754 in the left pivot mounts 744 and 746 and a bed pivot pin in the right pivot mounts 748 and 750.

Figure 8:
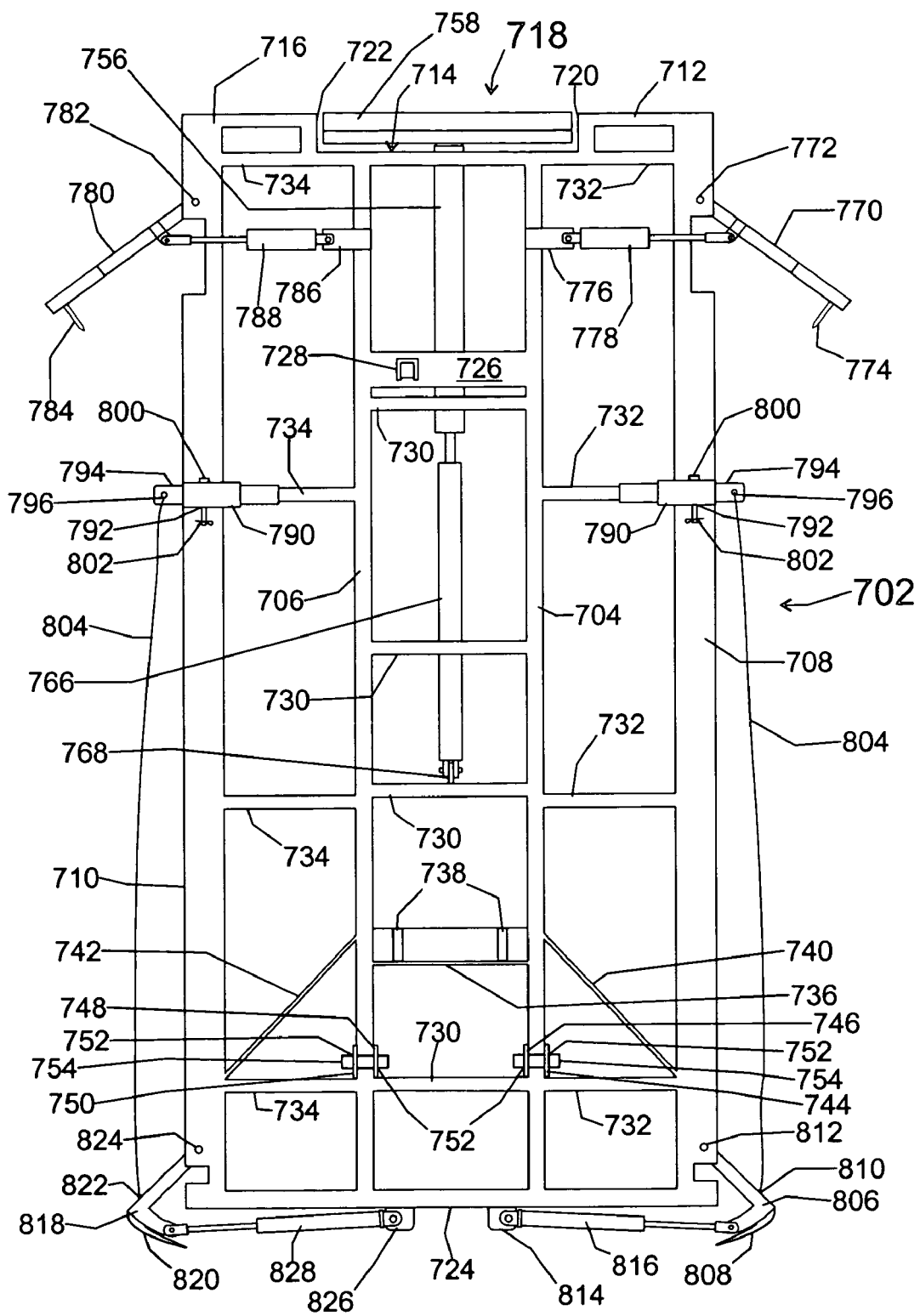
FIG. 8 is a bottom plan view of the preferred embodiment of a stack carriage bed assembly of the transporter and showing a left rear grapple bar in an open position, a right rear grapple bar in an open position, a left front load squeezer in an open position, and a right front load squeezer in an open position.
Figure 9:
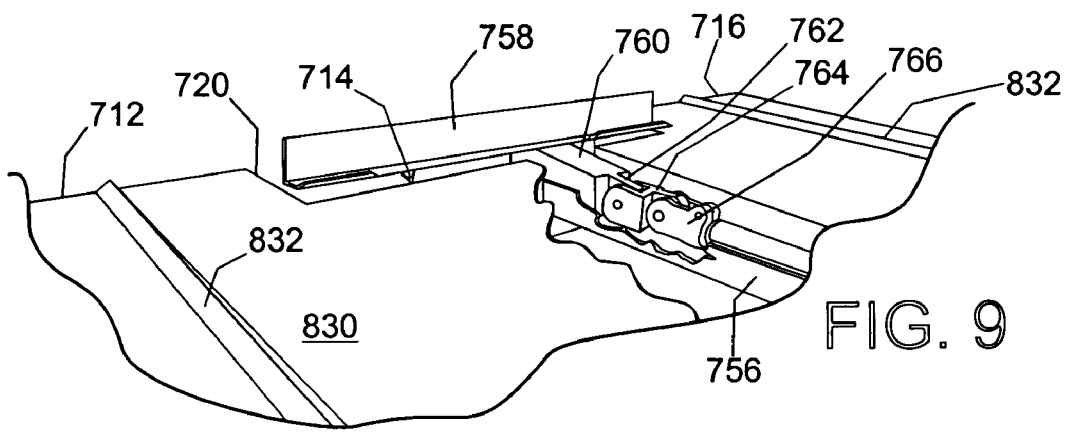
FIG. 9 is a partially cutaway perspective view of a portion of the carriage bed assembly showing a bale pullback blade in an erect position with a pullback actuator partially retracted.
Figure 10:
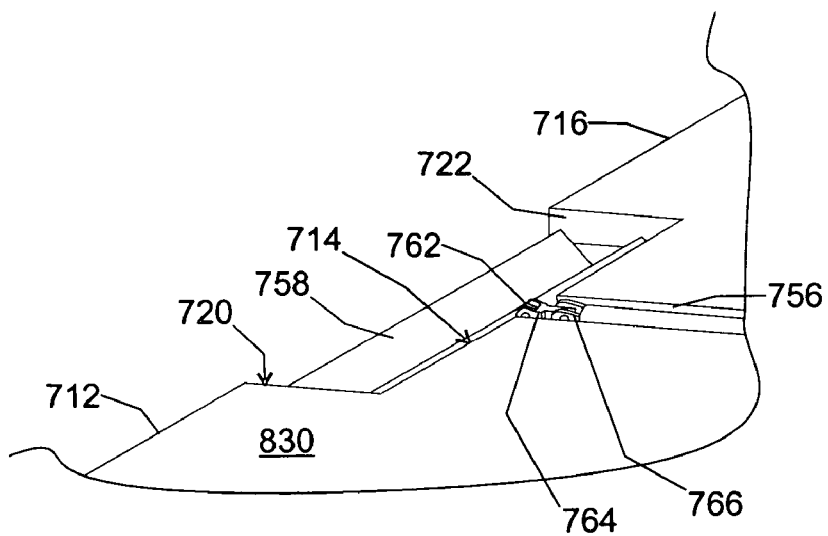
FIG. 10 is a perspective view of a portion of the carriage bed assembly showing a bale pullback blade in a downward recessed position (below the level of a stack carriage bed) with a pullback actuator fully extended.
Figure 11:
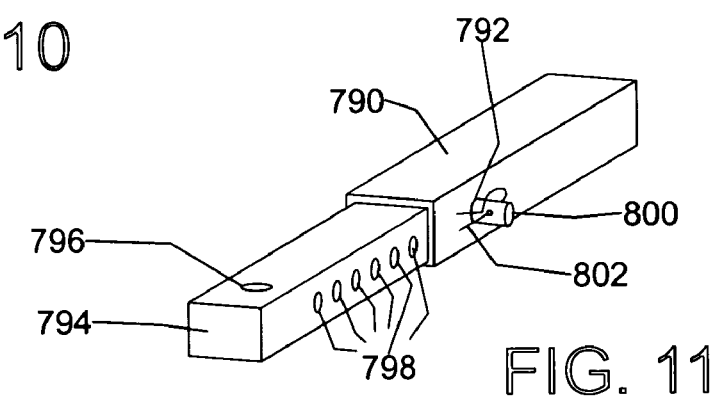
FIG. 11 is a perspective view of a cable anchor receiving tube, a cable anchor bar, and immediately associated features but not showing an attached anchor cable.

Referring to FIGS. 8, 9, and 10, the bed frame 702 further comprises a pullback notch 718 defined in the front perimeter of the stack carriage bed assembly 700 by the left pullback notch member 720, the central front outboard cross member 714, and the right pullback notch member 722, a bale pullback open channel track 756 attached to the central front outboard cross member 714 near the mid length of the central front outboard cross member and also preferably attached to another portion of the bed frame 702 located about one third of the way rearward from the front edge of the central front outboard cross member and with the open channel track generally aligned along the longitudinal centerline of the bed frame and with the channel track generally open through the top surfaces of the bed frame, a bale pullback blade 758 having generally an el shape attached preferably near its mid length to a bale pullback block 760 sized to be received and to slide fore and aft within and along the length of the open channel track 756, said block 760 having a rearward block mounting ear 762 pivotally connected to a bale pullback link 764 and the link pivotally connected between the block mounting ear and a bale pullback actuator 766. The bale pullback actuator 766 is pivotally connected between the bale pullback link 764 and a bale pullback actuator mounting ear 768 that is attached to the bed frame 702 (preferably to an appropriate central cross member 730 about one third of the way towards the rear of the bed frame as shown in FIG. 8) and the pullback actuator is aligned with the pullback open channel track 756 so that the actuator ram extends and retracts within and along the length of the track.

As best seen in FIGS. 9 and 10, the bale pullback block 760 and the bale pullback blade 758 move forward and rotate downward below the level of bed frame 702 when the pullback actuator 766 extends the blade and block forward and beyond the central front outboard cross member 714 and the block and blade rotate upward and the pullback blade extends upward above the level of the bed frame when the actuator retracts and pulls the block and blade back behind the front outboard cross member and then along the open channel track 756.

Preferably, the track 756 depends downward forward of the front edge of the central front outboard cross member 714 to cradle the block 760 and the blade 758 when the block and blade are forward of the front edge and downward which occurs when the linkage between the block mounting ear 762 and the bale pullback link 764 extends over and beyond the front edge of the cross member and away from the bed frame.

Preferably, the stack carriage bed assembly 700 further comprises a left front load squeezer 770 pivotally mounted to the left outboard longitudinal frame member 708 by a left front load squeezer pivot pin 772 and located about one eighth of the way rearward from the front boundary to the rear boundary of the bed frame 702 and preferably extending upward above the bed frame. Preferably, the left front load squeezer 770 rotates in towards and out away from the longitudinal axis of the bed assembly 700 by a left front load squeezer actuator 778 connected between the left front load squeezer and a left front load squeezer actuator mounting ear 776 that is attached to the bed frame 702 as shown in FIGS. 8 and 12. Preferably, the left front load squeezer 770 further comprises a left front load squeezer spike 774 attached to an upper portion of the load squeezer with the spike facing inwardly as shown in FIGS. 1, 2, and 8.

Preferably, the stack carriage bed assembly 700 further comprises a right front load squeezer 780 pivotally mounted to the right outboard longitudinal frame member 710 by a right front load squeezer pivot pin 782 and located about one eighth of the way rearward from the front boundary to the rear boundary of the bed frame 702 and preferably extending upward above the bed frame. Preferably, the right front load squeezer 780 rotates in towards and out away from the longitudinal axis of the bed assembly 700 by a right front load squeezer actuator 788 connected between the right front load squeezer and a right front load squeezer actuator mounting ear 786 that is attached to the bed frame 702 as shown in FIGS. 8 and 12. Preferably, the right front load squeezer 780 further comprises a right front load squeezer spike 784 attached to an upper portion of the load squeezer with the spike facing inwardly as shown in FIGS. 1, 2, and 8.

Preferably, the stack carriage bed assembly 700 further comprises two guy cable anchor receiving tubes 790 with one anchor receiving tube mounted on the left outboard longitudinal frame member 708 and with one anchor receiving tube mounted on the right outboard longitudinal frame member 710 and preferably each anchor receiving tube respectively located about one third of the way rearward from the front boundary to the rear boundary of the bed frame 702 as shown in FIG. 8 and with each anchor receiving tube having an anchor receiving tube transverse adjusting bore 792 and adjustably and slidingly receiving and retaining within the anchor receiving tube a guy cable anchor bar 794. Preferably, each guy cable anchor bar 794 has a guy cable anchor attachment bore 796 and a plurality of transverse adjusting bores 798 spaced and parallel to one another in said cable anchor bar for use and cooperation with the anchor receiving tube transverse adjusting bore and an anchor adjustment pin 800 to adjust the distance that each anchor bar extends outward beyond the respective outboard longitudinal member 708 and 710, an anchor safety clip 802 to secure the adjustment pin, and a guy cable 804 attached to the anchor bar through the respective attachment bore.

An alternative nonadjustable guy cable anchor bar 794' with an alternative guy cable anchor attachment bore 796' could be used as shown in FIGS. 12, 17, 18, and 19 with one alternative nonadjustablle anchor bar attached to each outboard longitudinal frame member 708 and 710 in place of the cable anchor receiving tubes 790 of the preferred embodiment.

Preferably, the stack carriage bed assembly 700 further comprises a left rear grapple bar 806 extending upward above the bed frame and pivotally mounted to the left outboard longitudinal frame member 708 by a left rear grapple bar pivot pin 812 and with the left rear grapple bar located near the rear boundary of the bed frame 702 and preferably with the left rear grapple bar having a plurality of left grapple hooks 808 distributed along the vertical length of the grapple bar with the grapple hooks curving inward towards a line perpendicular both to the center line and to the horizontal plane of the bed frame 702 and at or near the rear boundary of the bed frame. Preferably, the left rear grapple bar 806 rotates in towards and out away from the longitudinal axis of the bed assembly 700 by a left rear grapple bar actuator 816 connected between the left rear grapple bar and a left rear grapple bar actuator mounting ear 814 that is attached to the rear outboard cross member 724 of the bed frame 702 as shown in FIG. 8. Preferably, the left rear grapple bar 806 further comprises a left rear grapple bar cable anchor 810 attached between an upper portion of the left rear grapple bar and the guy cable 804 that is connected to the cable anchor bar 794 that is connected to the left outboard longitudinal member 708.

Preferably, the stack carriage bed assembly 700 further comprises a right rear grapple bar 818 extending upward above the bed frame and pivotally mounted to the right outboard longitudinal frame member 710 by a right rear grapple bar pivot pin 824 and with the right rear grapple bar located near the rear boundary of the bed frame 702 and preferably with the right rear grapple bar having a plurality of right grapple hooks 820 distributed along the vertical length of the grapple bar with the grapple hooks curving inward towards a line perpendicular both to the center line and to the horizontal plane of the bed frame 702 and at or near the rear boundary of the bed frame. Preferably, the right rear grapple bar 818 rotates in towards and out away from the longitudinal axis of the bed assembly 700 by a right rear grapple bar actuator 828 connected between the right rear grapple bar and a right rear grapple bar actuator mounting ear 826 that is attached to the rear outboard cross member 724 of the bed frame 702 as shown in FIG. 8. Preferably, the right rear grapple bar 818 further comprises a right rear grapple bar cable anchor 822 attached between an upper portion of the right rear grapple bar and the guy cable 804 that is connected to the cable anchor bar 794 that is connected to the right outboard longitudinal member 710.

Preferably, the stack carriage bed assembly 700 further comprises a stack carriage bed top surface skin 830 attached to the upper portions of the bed frame 702 and preferably with said bed top surface skin having a plurality of spaced and parallel stack carriage bed bale guiding ridges 832 extending above the bed top surface skin and distributed across the bed top surface skin and aligned parallel to the longitudinal axis of the bed frame.

Figure 20:
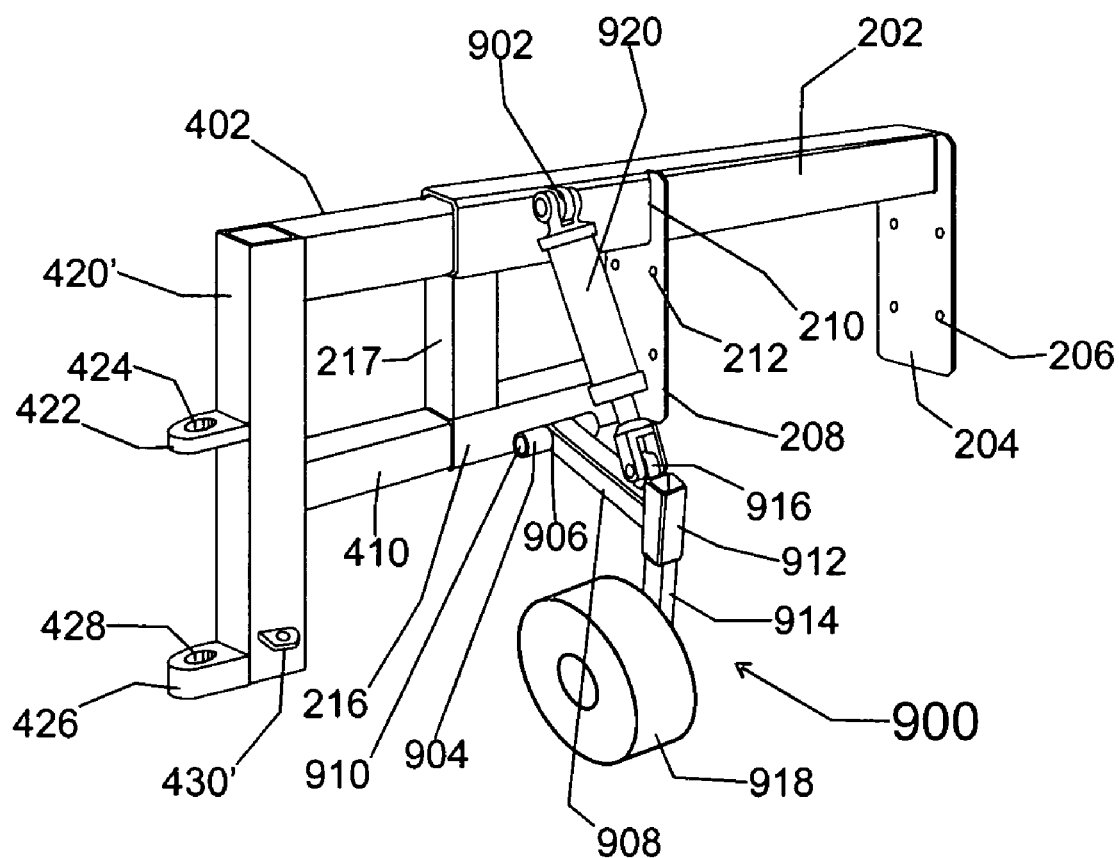
FIG. 20 is a perspective view of the alternative mounting tube assembly and showing a wheel extension assembly mounted to the receiving tube assembly.

FIGS. 18, 19, and 20 show an alternative mounting tube assembly received into the receiving tubes 202 and 216 of the receiving tube assembly 200 that does not incorporate the vertical adjustment feature of the preferred embodiment of the invention.

The alternative mounting tube assembly comprises a main nesting tube 402 attached at one end to an alternative vertical swing gate bracket tube 420' and the alternative vertical swing gate bracket tube is attached on that same side to a secondary nesting tube 410 that is spaced from and parallel to the main nesting tube. The free end of the main nesting tube 402 is adjustably and slidingly received and retained in the main receiving tube 202 and the free end of the secondary nesting tube 410 is adjustably and slidingly received and retained in the secondary receiving tube 216. Preferably, an alternative actuator ear 406' is attached to the alternative vertical swing gate bracket tube 420'. In this alternative embodiment, the alternative actuator ear 406' is connected to the receiving tube assembly extension actuator 222 in the place of the mounting tube connecting plate actuator ear 406 used in the preferred embodiment. As seen in FIGS. 18 and 19, the receiving tube assembly extension actuator 222 is connected between the extension actuator ear 220 and the alternative actuator ear 406' to allow lateral adjustment of the alternative mounting tube assembly in and out of the receiving tube assembly 200.

In the alternative embodiment of the mounting tube assembly, an upper swing gate bracket 422 having a upper swing gate bracket bore 424 is preferably attached to the side of the alternative vertical swing gate bracket tube 420' away from the transporter 6 and a lower swing gate bracket 426 having a lower swing gate bracket bore 428 is attached to the alternative vertical swing gate bracket tube spaced below and parallel to the upper swing gate bracket. An alternative swing gate bracket tube actuator ear 430' is attached preferably to the back surface of the bracket tube 420'.

FIG. 20 is a perspective view of the alternative mounting tube assembly and shows a wheel extension assembly 900 mounted to the receiving tube assembly 200. The wheel extension assembly 900 comprises a main receiving tube wheel assembly actuator ear 902 attached to the backward surface of the main receiving tube 202 at a point about halfway outward from the left mounting plate 208 along the main receiving tube towards the free end of the main receiving tube, a secondary receiving tube wheel assembly pivot mounting 904 having a central strut receiving gap 906 attached to the backward surface of the secondary receiving tube 216 and aligned generally vertically below the wheel assembly actuator ear, and said wheel assembly pivot mounting having two coaxial pivot mounting bores spaced about the strut receiving gap, a main wheel assembly strut 908 having a strut transverse bore at one end for rotatable mounting in the strut receiving gap 906 by a strut pivot pin 910 inserted into the pivot mounting bores and having a stub axle socket 912 at the other end, said stub axle socket receiving and retaining a stub axle strut 914, a main wheel assembly strut actuator ear 916 attached to the upper surface of said wheel assembly strut near the stub axle socket and away from the strut transverse bore, a wheel 918 rotatably attached to the stub axle strut, and a wheel assembly actuator 920 connected between the wheel assembly actuator ear and the strut actuator ear by use of pins and clips as well known in the art.

The wheel assembly actuator 920 can be selectively extended to first lower the wheel 918 into contact with the ground beneath the transporter 6 and then force can be applied against the ground through the wheel to counteract the downward force imposed on the transporter when the pickup arm assembly 600 lifts a big bale from the ground.

In the preferred embodiment, the transporter 6 can be adjusted to accommodate variations in the dimensions of the big bales to be handled: the swing gate assembly 500 and the pickup arm assembly 600 can be raised or lowered by changing the vertical position of the vertical adjustment plate 412 relative to the mounting tube connecting plate 404 to accommodate variations in the vertical dimension of big bales; the mounting tube assembly 400 can be laterally adjusted by using the receiving tube assembly extension actuator 222 to selectively adjust the placement position of a bale deposited onto the elevating and flipping receiving table assembly 300 and relative to the longitudinal axis of the stack carriage bed assembly 700 to accommodate variations in the length of big bales; and the cable anchor bars 794 can be adjusted inwardly or outwardly in the cable anchor receiving tubes 790 to accommodate variations in the length of big bales.

From the preceding, it should be apparent that the present invention provides a useful new big bale, retriever, and transporter and methods that allow for convenient, easy modification of a vehicle or truck to permit the lifting, rotating, and depositing of a bale from the ground in the field onto and across a receiving table of the transporter, the consolidating of multiple bales into a consolidated stack on a stack carriage bed of the transporter, the transporting of the consolidated stack to a chosen location, and the depositing of the consolidated stack at the location and to permit the retrieving of a consolidated stack of bales by the transporter and the transporting of the retrieved consolidated stack to another location.

Preferably, moving parts of the invention are adequately lubricated by use of devices well known in the art including the use of zerk fittings.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

We claim:

1. A big bale loader, retriever, and transporter comprising a truck having a main frame, said main frame having a right frame channel spaced from and generally parallel to a left frame channel, each said channel having a rearward open end, said channels connected to one another by a plurality of spaced frame cross members including a rearmost frame cross member, said rearmost frame cross member spaced forward away from said rearward open ends, a stack carriage bed mounting attached to said channels between said rearward open ends and spaced rearward from said rearmost frame cross member, said bed mounting having a right main pivot pin hole spaced from and coaxial to a left main pivot pin hole, a stack carriage bed main actuators frame mounting attached to said main frame, said stack carriage bed main actuators frame mounting having a right main actuator mounting plate with a right main actuator mounting ear attached to the rearward side of said right main actuator mounting plate, said right main actuator mounting plate attached to said rearmost frame cross member, a receiving tube assembly having a main receiving tube attached to said main frame spaced forward away from said rearmost frame cross member, two spacer blocks spaced from one another and each said block attached to the forward surface of said main receiving tube, an elevating and flipping receiving table assembly attached to said two spacer blocks, a mounting tube assembly adjustably and slidingly received and retained within said receiving tube assembly, a swing gate assembly pivotally connected to said mounting tube assembly, a pickup arm assembly pivotally connected to said swing gate assembly, a stack carriage bed assembly pivotally connected to said bed mounting by two bed pivot pins inserted in said main pivot pin holes, a bed actuator mounting having a bed actuator mounting ear attached to the underside of said bed assembly, and a main actuator connected between said right main actuator mounting ear and said bed actuator mounting ear.

2. A big bale loader, retriever, and transporter comprising a modified ten wheel truck having a longitudinal main frame [10], said main frame 10 has a longitudinal right frame channel [12], said right frame channel having a rearward open end, said right frame channel spaced from and generally parallel to a left frame channel [14], said left frame channel having a rearward open end, said channels connected to one another by a plurality of spaced frame cross members including a rearmost frame cross member [16] spaced forward away from the rearward open ends, a second rearmost frame cross member [18], and a third rearmost frame cross member [20], a stack carriage bed mounting [44] being an integral H-shaped member attached between said rearward open ends, said stack carriage bed mounting having a right upper leg [50] with a transverse stack carriage bed right main pivot pin hole [52] and a left upper leg 60 with a stack carriage bed left main pivot pin hole [62], said right main pivot pin hole spaced from and coaxial to the left main pivot pin hole, a right main actuator mounting plate [82] having a right main actuator mounting ear [84] attached to the rearward side of said right main actuator mounting plate, said right main actuator mounting plate attached to said rearmost frame cross member, a right main actuator [106] connected between said right main actuator mounting ear and a bed actuator mounting ear [738], a receiving tube assembly [200] attached to said main frame spaced forward away from said rearmost frame cross member and mounted across said right frame channel and said left frame channel, said receiving tube assembly having a main receiving tube [202], said main receiving tube extending outward beyond said left frame channel and having a receiving tube assembly extension actuator ear [220] attached to its front side, a receiving tube assembly extension actuator [222] attached to said extension actuator ear, two spacer blocks [218] spaced from one another and each said block attached to the forward surface of said main receiving tube an elevating and flipping receiving table assembly [300] attached to said spacer blocks, said table assembly including a right mast channel [302] spaced from and parallel to a left mast channel [304] both said mast channels depend upward vertically with said right mast channel overlying said right frame channel, and said left mast channel overlying said left frame channel, said mast channels connected at their lower ends by a mast base [306] that spans between said lower ends, a mast carriage assembly [314] rides up and down in the space between said mast channels, said mast carriage assembly having a mast carriage frame [316], said mast carriage frame having an upper wall connected to two spaced and parallel side walls, a mast carriage frame actuator ear [318] attached to the lower surface of said upper wall, a mast base actuator ear [310] attached to the upper surface of said mast base, a receiving table elevating actuator [312] connected to said mast base actuator ear and said mast carriage frame actuator ear, a right fork [328] attached to said mast carriage frame and extending towards the rear of said transporter, a pair of right fork hinge ears [330] attached to the outer end of said right fork and each said hinge ear having a right fork hinge ear aperture [332] coaxial to said hinge ear aperture in the other hinge ear, a right fork pivot sleeve [334] having a right fork pivot sleeve bore [336] said right pivot sleeve sized to be rotatably received and retained between said right fork hinge ears and retained there by a right fork pivot pin [338] inserted into said right fork hinge ear apertures and said right fork pivot sleeve bore, a left fork [340] attached to said mast carriage frame and extending towards the rear of said transporter, a pair of left fork hinge ears [342] attached to the outer end of said left fork and each said hinge ear having a left fork hinge ear aperture [344] coaxial to said hinge ear aperture in the other hinge ear, a left fork pivot sleeve [346] having a left fork pivot sleeve bore [348] said left pivot sleeve sized to be rotatably received and retained between said left fork hinge ears and retained there by a left fork pivot pin [350] inserted into said left fork hinge ear apertures and said left fork pivot sleeve bore, a table tilting actuator mounting frame [352] attached to and between said forks, an actuator mounting frame actuator ear [354] attached to said actuator mounting frame at a point on said mounting frame below each said fork, a receiving table frame [358] hinged along its rearward edge and attached along that rearward edge to said fork pivot sleeves, a receiving table actuator ear [360] attached to said table frame at a point of said table frame separated away from the hinged edge and above the level of said frame actuator ear, a receiving table top surface skin [362] attached to the upper surface of said table frame, a table tilting actuator [356] connected between said frame actuator ear and said table actuator ear, whereby said table frame can be raised from a horizontal bale receiving position to a flipping position and returned to said bale receiving position by using said tilting actuator, a mounting tube assembly [400] adjustably and slidingly received and retained within said receiving tube assembly, said mounting tube assembly having a main nesting tube [402] at one end attached to a mounting tube connecting plate [404], the free end of said main nesting tube adjustably and slidingly received and retained within said main receiving tube, a mounting tube connecting plate actuator ear [406] attached to said connecting plate, said receiving tube assembly extension actuator connected between said extension actuator ear and said mounting tube connecting plate actuator ear to allow lateral adjustment of said mounting tube assembly in and out of said receiving tube assembly, a vertical adjustment plate [412] sized and shaped similarly to said connecting plate attached to said connecting plate by a plurality of connecting plate bolts [416] and a plurality of connecting plate nuts [418], a vertical swing gate bracket tube [420] attached to the side of said vertical adjustment plate away from said connecting plate, an upper swing gate bracket [422] having an upper swing gate bracket bore [424] attached to the side of said bracket tube away from said transporter and a lower swing gate bracket [426] having a lower swing gate bracket bore [428] attached to said bracket tube spaced below and parallel to said upper swing gate bracket and a swing gate bracket tube actuator ear [430] attached to the back surface of said bracket tube, a swing gate assembly [500] comprising a vertical bearing pipe [502] having a vertical bearing pipe bore [504], a horizontal gate member [506] attached to the lower portion of said vertical bearing pipe perpendicular to said vertical bearing pipe, an outermost vertical shoulder pivot support member [508] attached to the outer end of said horizontal gate member and depending upwardly, a swing gate actuator ear [509] attached to the back surface of said horizontal gate member, a second outermost vertical shoulder pivot support member [510] attached to said horizontal gate member and depending upwardly and spaced from and parallel to said outermost vertical shoulder pivot support member, a third outermost vertical shoulder pivot support member [512] attached to said horizontal gate member and depending upwardly and spaced from and parallel to said second outermost vertical shoulder pivot support member, and a fourth outermost vertical shoulder pivot support member [514] having an upper portion [516] spaced from and parallel to said third outermost vertical shoulder pivot support member and a lower portion angled toward said vertical bearing pipe attached to said horizontal gate member near said vertical bearing pipe, said vertical bearing pipe pivotally connected and retained by a swing gate pivot pin [432] within and between said swing gate brackets, a swing gate assembly actuator [436] connected between said bracket tube actuator ear and said swing gate actuator ear, four coaxial shoulder pivot pin bores [520] with one shoulder pivot support bore in each said pivot support member and spaced and parallel to the longitudinal axis of said horizontal gate member and four shoulder pivot pin collars [522] attached one to each said vertical shoulder pivot support member coaxial with the adjacent shoulder pivot pin bore with one collar on the inboard side of said fourth outermost vertical shoulder pivot support member closest to said vertical bearing pipe, with one collar on the outboard side of said outermost vertical shoulder pivot support member, with one collar on the side of said third outermost vertical shoulder pivot support member closest to said second outermost vertical shoulder pivot support member, and with one collar on the side of said second outermost vertical shoulder pivot support member closest to the third outermost vertical shoulder pivot support member, two shoulder pivot pins [526], said swing gate assembly further comprising two extending lower portions [532, 534] of said second and third outermost vertical shoulder pivot support members extending forward in the same vertical planes as their respective support member and perpendicularly through a vertical plane located along the right side of said horizontal gate member when viewed from the vertical axis of said vertical bearing pipe and viewing outward along the length of said horizontal gate member, two coaxial ankle pivot pin bores [535] with one in each said extending lower portion and spaced from and parallel to the longitudinal axis of said horizontal gate member 506, a pickup arm assembly [600] comprising a horizontal crossbeam tube [602], two first lower ends [604, 606] of two inverted, spaced, parallel, and identically L-shaped arm supports [608, 610] with each first lower end attached to said horizontal crossbeam tube and spaced about the mid-length point of said horizontal crossbeam tube to enable said extending portions [532, 534] to be received there between, two upper ends of said arm supports attached each respectively to a separate shoulder pivot pin bearing pipe [616, 618] with said shoulder pivot pin bearing pipes spaced from and coaxial to one another and with each said pin bearing pipe having within a shoulder pivot pin bronze bushing [620] with each said shoulder pivot pin bearing pipe and bushing sized to receive and rotatably retain within one shoulder pivot pin [526], two coaxial elbow pivot pin bores [626] with one said elbow pivot pin bore in and through each said arm support, an elbow pivot pin [632], with said elbow pivot pin received and retained in said elbow pivot pin bores, an inwardly disposed clamping arm [640] attached to the inward end of said horizontal crossbeam tube and an outwardly disposed clamping arm [642] pivotally connected to said horizontal cross beam tube by use of a clamping arm pivot pin [644], a clamping actuator [646] connected between said horizontal cross beam tube and said outwardly disposed clamping arm, said two shoulder pivot pin bearing pipes received into cooperating and rotatable relationships with the swing gate assembly with one shoulder pivot pin bearing pipe rotatably mounted between said fourth outermost vertical shoulder pivot support member and said third outermost vertical shoulder pivot support member and retained there by one of said shoulder pivot pins inserted into said shoulder pivot pin bores of said fourth outermost vertical shoulder pivot support member and said third outermost vertical shoulder pivot support member and into said shoulder pivot pin bearing pipe and with the other shoulder pivot pin bearing pipe rotatably mounted between said outermost vertical shoulder pivot support member and said second outermost vertical shoulder pivot support member and retained there by one of said shoulder pivot pins inserted into said shoulder pivot pin bores of said outermost vertical shoulder pivot support member and said second outermost vertical shoulder pivot support member and into said shoulder pivot pin bearing pipe, said pickup arm assembly pivotally connected to said swing gate assembly by said shoulder pivot pins, said ankle pivot pin, and said elbow pivot pin, a pick up arm lifting actuator [550] having an upper connector and a lower connector connected between said ankle pivot pin and said elbow pivot pin by threading said elbow pivot pin through said upper connector before said elbow pivot pin received and retained in said elbow pivot pin bores and by threading said ankle pivot pin through said lower connector before said ankle pivot pin received and retained in said ankle pivot pin bores, a stack carriage bed assembly [700] pivotally connected to said stack carriage bed mounting by two bed pivot pins [754] inserted in said main pivot pin holes, said stack carriage bed assembly comprising a stack carriage bed frame [702] comprising a left main longitudinal frame member [704] spaced from and generally parallel to a right main longitudinal frame member [706] with said main longitudinal members overlaying said right and left frame channels, a plurality of central cross members [730] attached between said left and right main longitudinal frame members and distributed from the front to the rear of said bed frame, a left outboard longitudinal frame member [708] spaced from and generally parallel to said left main longitudinal frame member, a plurality of left outboard cross members [732] attached between said left main longitudinal frame member and said left outboard longitudinal frame member and distributed from the front to the rear of said bed frame, a right outboard longitudinal frame member [710] spaced from and generally parallel to said right main longitudinal frame member, a plurality of right outboard cross members [734] attached between said right main longitudinal frame member and said right outboard longitudinal frame member and distributed from the front to the rear of said bed frame, a left front outboard cross member [712] attached at one end to the front end of said left outboard longitudinal frame member and at the other end to a left pullback notch member [720], said left pullback notch member attached to a central front outboard cross member [714] that crosses the longitudinal centerline of said bed frame, said central front outboard cross member attached across the front ends of said left main longitudinal frame member and said right main longitudinal frame member and attached to a right pullback notch member [722], said right pullback notch member attached to a right front outboard cross member [716], said right front outboard cross member attached to the front end of said right outboard longitudinal frame member, and a rear outboard cross member [724]

attached to the rearward ends of said longitudinal frame members [704, 706, 708, 710], a bed actuator mounting [736] having a bed actuator mounting ear [738] attached to the underside of said bed assembly and attached between said left and right main longitudinal frame members and located about one quarter of the way forward from the back boundary to the front boundary of said bed frame, a left outer bed pivot mount [744] having a bed pivot pin bore [752] attached to the outboard side of said left main longitudinal frame member, a left inner bed pivot mount [746] having a bed pivot pin bore [752] attached to the inboard side of said left main longitudinal frame member, a right inner bed pivot mount [748] having a bed pivot pin bore [752] attached to the inboard side of said right main longitudinal frame member, and a right outer bed pivot mount [750] having a bed pivot pin bore [752] attached to the outboard side of said right main longitudinal frame member, each said bed pivot mount located about one eighth of the way forward from the back boundary to the front boundary of said bed frame, said four bed pivot pin bores coaxial and perpendicular to the longitudinal axis of said bed frame and in a plane spaced from and parallel to the plane of the surface on which said transporter rests and said bed pivot pin bores sized to receive and rotatably retain a bed pivot pin [754] in said left pivot mounts and a bed pivot pin in said right pivot mounts, a pullback notch [718] defined in the front perimeter of said stack carriage bed assembly by said left pullback notch member, said central front outboard cross member, and said right pullback notch member, a bale pullback open channel track [756] attached to said central front outboard cross member near the mid length of said central front outboard cross member and attached to another portion of said bed frame located about one third of the way rearward from the front edge of said central front outboard cross member and with said open channel track generally aligned along the longitudinal centerline of said bed frame and with said channel track generally open through the top surfaces of said bed frame, a bale pullback blade [758] having generally an el shape attached near its mid length to a bale pullback block [760] sized to be received and to slide fore and aft within and along the length of said open channel track, said block having a rearward block mounting ear [762] pivotally connected to a bale pullback link [764] and said link pivotally connected between said block mounting ear and a bale pullback actuator [766], said bale pullback actuator pivotally connected between said bale pullback link and a bale pullback actuator mounting ear [768] attached to said bed frame about one third of the way towards the rear of said bed frame and said pullback actuator aligned with said pullback open channel track so that the actuator ram extends and retracts within and along the length of said track, said bale pullback block and said bale pullback blade move forward and rotate downward below the level of said bed frame when said pullback actuator extends said blade and block forward and beyond said central front outboard cross member and said block and blade rotate upward and said pullback blade extends upward above the level of said bed frame when said actuator retracts and pulls said block and blade back behind said front outboard cross member and then along said open channel track, a left front load squeezer [770] pivotally mounted to said left outboard longitudinal frame member by a left front load squeezer pivot pin [772] and located about one eighth of the way rearward from the front boundary to the rear boundary of said bed frame and extending upward above said bed frame, said left front load squeezer rotates in towards and out away from the longitudinal axis of said bed assembly by a left front load squeezer actuator [778] connected between said left front load squeezer and a left front load squeezer actuator mounting ear [776] attached to said bed frame, a right front load squeezer [780] pivotally mounted to said right outboard longitudinal frame member by a right front load squeezer pivot pin [782] and located about one eighth of the way rearward from the front boundary to the rear boundary of said bed frame and extending upward above said bed frame, said right front load squeezer rotates in towards and out away from the longitudinal axis of said bed assembly by a right front load squeezer actuator [788] connected between said right front load squeezer and a right front load squeezer actuator mounting ear [786] attached to said bed frame, a left rear grapple bar [806] extending upward above said bed frame and pivotally mounted to said left outboard longitudinal frame member by a left rear grapple bar pivot pin [812] and with the left rear grapple bar located near the rear boundary of said bed frame and with said left rear grapple bar having a plurality of left grapple hooks [808] distributed along the vertical length of said grapple bar with said grapple hooks curving inward towards a line perpendicular both to the center line and to the horizontal plane of said bed frame and at or near the rear boundary of said bed frame, said left rear grapple bar rotates in towards and out away from the longitudinal axis of said bed assembly by a left rear grapple bar actuator [16] connected between said left rear grapple bar and a left rear grapple bar actuator mounting ear [814] attached to said rear outboard cross member of said bed frame, a right rear grapple bar [818] extending upward above said bed frame and pivotally mounted to said right outboard longitudinal frame member by a right rear grapple bar pivot pin [824] and with said right rear grapple bar located near the rear boundary of said bed frame and with said right rear grapple bar having a plurality of right grapple hooks [820] distributed along the vertical length of said grapple bar with said grapple hooks curving inward towards a line perpendicular both to the center line and to the horizontal plane of said bed frame and at or near the rear boundary of said bed frame, said right rear grapple bar rotates in towards and out away from the longitudinal axis of said bed assembly by a right rear grapple bar actuator [828] connected between said right rear grapple bar and a right rear grapple bar actuator mounting ear [826] attached to said rear outboard cross member of said bed frame.

* * * * *